US012711926B2

(12) United States Patent
Kim

(10) Patent No.: US 12,711,926 B2
(45) Date of Patent: Aug. 18, 2026

(54) POWER MANAGEMENT CIRCUIT AND DISPLAY DEVICE

(71) Applicant: LG Display Co., Ltd., Seoul (KR)

(72) Inventor: Dongju Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/338,144

(22) Filed: Sep. 24, 2025

(65) Prior Publication Data

US 2026/0162625 A1 Jun. 11, 2026

(30) Foreign Application Priority Data

Dec. 9, 2024 (KR) ........................ 10-2024-0181803

(51) Int. Cl.
*G09G 3/3291* (2016.01)
*G09G 3/32* (2016.01)
*G09G 3/3266* (2016.01)
*H02M 3/158* (2006.01)

(52) U.S. Cl.
CPC ............. *G09G 3/3291* (2013.01); *G09G 3/32* (2013.01); *G09G 3/3266* (2013.01); *H02M 3/1582* (2013.01); *G09G 2310/0267* (2013.01); *G09G 2310/0275* (2013.01); *G09G 2310/08* (2013.01); *G09G 2330/022* (2013.01)

(58) Field of Classification Search
CPC .................. G09G 3/3291; G09G 3/32; G09G 2310/0267; G09G 3/3266; G09G 2310/0275; G09G 2310/08; G09G 2330/022; H02M 3/1582
See application file for complete search history.

(56) References Cited

U.S. PATENT DOCUMENTS

2023/0080254 A1* 3/2023 Yoon ..................... G06F 1/3262 713/323
2023/0145805 A1* 5/2023 Kim ..................... G09G 3/2096 345/691
2024/0290266 A1* 8/2024 Park ......................... G09G 3/32

FOREIGN PATENT DOCUMENTS

KR 10-2284049 B1 8/2021
KR 10-2420491 B1 7/2022

* cited by examiner

*Primary Examiner* — Muhammad N Edun
(74) *Attorney, Agent, or Firm* — Seed Intellectual Property Law Group LLP

(57) ABSTRACT

The present disclosure provides a power management circuit and a display device that are capable of reducing power consumption based on a structure where at least one driving voltage supply circuit in the power management circuit is controlled to be deactivated during the period of at least one sub-frame.

19 Claims, 12 Drawing Sheets

POWER MANAGEMENT CIRCUIT AND DISPLAY DEVICE

CROSS REFERENCE TO RELATED APPLICATION

This application claims priority from Korean Patent Application No. 10-2024-0181803, filed on Dec. 9, 2024, in the Korean Intellectual Property Office, which is hereby incorporated by reference for all purposes as if fully set forth herein.

BACKGROUND

Technical Field

The present disclosure relates to electronic devices, and more specifically, to a power management circuit and a display device including the power management circuit.

Description of the Related Art

In today's information society, display devices for presenting images or visual information to users are increasingly important. The need for such display devices has caused display technology to be rapidly developed, and various types of display devices, such as a liquid crystal display (LCD) device, an organic light emitting diode (OLED) display device, and the like, have been developed and used.

Among these display devices, organic light emitting display devices using self-emissive organic light emitting diodes (OLED) exhibit high response speed and have advantages in contrast ratio, emission efficiency, luminance, viewing angle, and the like, compared with other types of display devices such as liquid crystal display (LCD) devices and the like.

Power management is becoming increasingly important, and to reduce power consumption, display devices can employ a variable refresh rate (VRR) mode in which a refresh rate can be changed. When a display device displays a still image that does not require rapid updating of data voltage in the VRR mode, a frame period of a driving transistor can be reduced to allow the driving transistor to be driven at a low rate. Thereby, the display device can reduce power consumption. However, display devices may not minimize power consumption only by employing the VRR mode.

BRIEF SUMMARY

One or more aspects of the present disclosure may provide a power management circuit and a display device that are configured to deactivate operation of at least one driving voltage supply circuit during a specific sub-frame, and thereby are capable of reducing power consumption.

One or more aspects of the present disclosure may provide a power management circuit and a display device that are configured to change a voltage output from at least one voltage conversion circuit during a specific sub-frame, and thereby are capable of reducing power consumption.

One or more aspects of the present disclosure may provide a power management circuit and a display device that are configured to operate in a force continuous current mode (FCCM) during a period where a voltage output from a voltage conversion circuit is changed, and thereby are capable of reducing time delay when the voltage is changed.

Aspects, examples, and embodiments provided in the present disclosure are not limited to the foregoing description, and additional aspects, examples, and embodiments provided in the present disclosure will become apparent to those skilled in the art from the following description.

According to one or more example embodiments of the present disclosure, a display device can be provided that includes a display panel including a plurality of gate lines, a plurality of data lines, and a plurality of subpixels, a data driving circuit configured to supply data voltages to the plurality of data lines, a gate driving circuit configured to drive the plurality of gate lines, a controller configured to supply image data corresponding to the data voltages to the data driving circuit and control the data driving circuit and the gate driving circuit, and a power management circuit including a plurality of voltage conversion circuits, and a plurality of driving voltage supply circuits each configured to supply a driving voltage to at least one of the plurality of subpixels, the data driving circuit, the gate driving circuit, and the controller based on an input voltage supplied from a corresponding one of the plurality of voltage conversion circuits.

In one or more aspects, the power management circuit may be configured to cause a first driving voltage supply circuit configured to supply a first driving voltage to the data driving circuit among the plurality of driving voltage supply circuits to be deactivated during at least one first sub-frame in at least one frame corresponding to the image data.

According to one or more example embodiments of the present disclosure, a power management circuit can be provided that includes a first voltage conversion circuit configured to convert an initial voltage supplied from a system power supply into a first input voltage, a second voltage conversion circuit configured to convert the initial voltage into a second input voltage, a first driving voltage supply circuit configured to generate a first driving voltage based on the first input voltage and supply the first driving voltage to a data driving circuit, the first driving voltage supply circuit being deactivated during at least one first sub-frame in at least one frame corresponding to image data supplied from a controller to the data driving circuit, and a second driving voltage supply circuit configured to generate a second driving voltage based on the second input voltage and supply the second driving voltage to the data driving circuit, the second driving voltage supply circuit being deactivated during at least one second sub-frame in the at least one frame According to one or more aspects of the present disclosure, a power management circuit and a display device may be provided that are capable of reducing power consumption by deactivating operation of at least one driving voltage supply circuit during a specific sub-frame.

According to one or more aspects of the present disclosure, a power management circuit and a display device may be provided that are capable of reducing power consumption by changing a voltage output from at least one voltage conversion circuit during a specific sub-frame.

According to one or more aspects of the present disclosure, a power management circuit and a display device may be provided that are capable of allowing a force continuous current mode (FCCM) to operate during a period where a voltage output from a voltage conversion circuit is changed and reducing time delay when the voltage is changed.

Effects or features from aspects, examples, and embodiments described herein are not limited thereto, and additional effects or features will become apparent to those skilled in the art from the following description.

BRIEF DESCRIPTION OF THE SEVERAL VIEWS OF THE DRAWINGS

Aspects, examples, and embodiments discussed herein will be more fully understood from the detailed description and accompanying drawings provided below. It should be understood here that since alternative aspects, examples, and embodiments may add, omit, or change elements, structures, configurations, and the like, therefore, aspects, examples, and embodiments described herein are not meant to be limitations. In the drawings.

DETAILED DESCRIPTION

Figure 1:
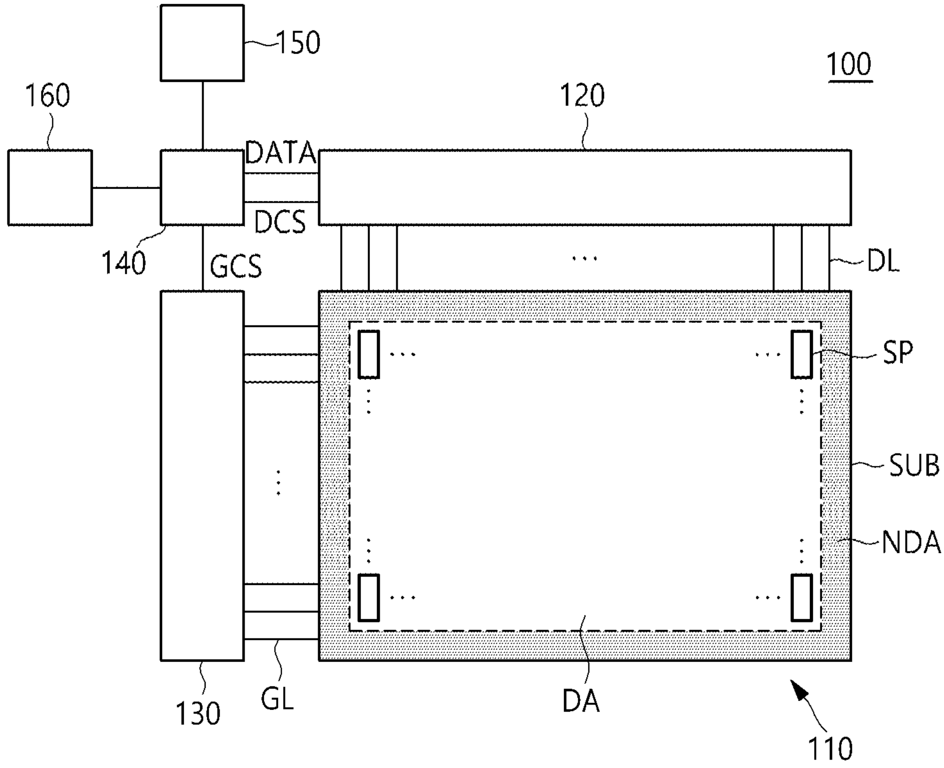
FIG. 1 is a system configuration of an example display device according to aspects of the present disclosure.

Reference will now be made in detail to example embodiments of the present disclosure, examples or aspects of which may be illustrated in the accompanying drawings. In the following description, the structures, implementations, methods, and operations described herein are not limited to the specific examples, aspects, and embodiments set forth herein and may be changed as is known in the art, unless otherwise specified. Like reference numerals designate like elements throughout, unless otherwise specified. Names of the respective elements used in the following explanations are selected only for convenience of writing the specification and may thus be different from those used in actual products. Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the protected scope of the present disclosure is defined by claims and their equivalents. In the following description, where the detailed description of the relevant known function or configuration may unnecessarily obscure aspects of the present disclosure, a detailed description of such known function or configuration may be omitted. The shapes, sizes, ratios, angles, numbers, and the like, which are illustrated in the drawings to describe various example embodiments of the present disclosure, are merely given by way of example. Therefore, the present disclosure is not limited to the illustrations in the drawings. The terms such as "including," "having," "containing, "constituting" "make up of," and "formed of" used herein are generally intended to allow other components to be added unless the terms are used with the term "only." As used herein, singular forms are intended to include plural forms unless the context clearly indicates otherwise.

Although the terms "first," "second," A, B, (a), (b), and the like may be used herein to describe various elements, these elements should not be interpreted to be limited by these terms as they are not used to define a particular order or precedence. These terms are used only to distinguish one element from another. For example, a first element could be termed a second element, and, similarly, a second element could be termed a first element, without departing from the scope of the present disclosure.

When it is mentioned that a first element "is connected or coupled to," "contacts," "overlaps with," or the like a second element, it should be interpreted that, not only can the first element "be directly connected or coupled to," "directly contact," or "directly overlap with" the second element, but a third element can also be "interposed" between the first and second elements, or the first and second elements can "be connected or coupled to," "contact," "overlap with," or the like each other via a fourth element. Here, the second element may be included in at least one of two or more elements that "are connected or coupled to," "contact," "overlap with," or the like each other.

Where positional relationships are described, for example, where the positional relationship between two parts is described using "on," "over," "under," "above," "below," "beside," "next," or the like, one or more other parts may be located between the two parts unless a more limiting term, such as "immediate(ly)," "direct(ly)," or "close(ly)" is used. For example, where an element or layer is disposed "on" another element or layer, a third element or layer may be interposed therebetween. Furthermore, the terms "left," "right," "top," "bottom, "downward," "upward," "upper," "lower," and the like refer to an arbitrary frame of reference.

In addition, when any dimensions, relative sizes, etc., are mentioned, it should be considered that numerical values for an elements or features, or corresponding information (e.g., level, range, and the like) include a tolerance or error range that may be caused by various factors (e.g., process factors, internal or external impact, noise, and the like) even when a relevant description is not specified. Further, the term "may" fully encompasses all the meanings of the term "can".

In the following description, various example aspects of the present disclosure are described in detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings may be different from an actual scale, dimension, size, and thickness, and thus, aspects of the present disclosure are not limited to a scale, dimension, size, and thickness illustrated in the drawings.

FIG. 1 is a system configuration of an example display device 100 according to aspects of the present disclosure.

Referring to FIG. 1, in one or more example embodiments, the display device 100 may include a display panel 110 and at least one driving circuit for driving the display panel 110.

The at least one driving circuit may include a data driving circuit 120 and a gate driving circuit 130, and further include a controller 140 configured to control the data driving circuit 120 and the gate driving circuit 130, and a power management circuit 150 configured to supply driving voltages.

The display panel 110 may include a plurality of subpixels SP connected to a plurality of data lines DL and a plurality of gate lines GL.

The display panel 110 may include a display area DA where an image can be displayed and a non-display area NDA where an image is not displayed and is located outside of the display area DA. For example, a plurality of subpixels SP for displaying images may be disposed in the display area DA of the display panel 110. Driving circuits (120, 130, 140, 150) may be electrically connected to the non-display area NDA of the display panel 110, or at least one of the driving circuits (120, 130, 140, 150) may be mounted on the non-display area NDA of the display panel 110. A pad part to which at least one integrated circuit or at least one printed circuit is connected may be disposed in the non-display area NDA.

The data driving circuit 120 may be a circuit for driving a plurality of data lines DL and can supply data signals to the plurality of data lines DL. The gate driving circuit 130 may be a circuit for driving a plurality of gate lines GL and can supply gate signals to the plurality of gate lines GL.

For example, the gate signals may include at least one scan gate signal and at least one emission control gate signal.

The controller 140 can supply at least one data control signal DCS and at least one gate control signal GCS to the data driving circuit 120 and the gate driving circuit 130 respectively for controlling operation times of the data driving circuit 120 and the gate driving circuit 130.

The controller 140 can control the initiation of scan operation for pixels according to respective timings set in each frame. The controller 140 can convert image data received from an external device or system (e.g., a host system 160) to a data signal form readable by the data driving circuit 120, and then supply image data DATA resulting from the converting to the data driving circuit 120. The controller 140 can control data driving at times set for scanning corresponding one or more of the pixels.

The controller 140 can receive display driving control signals along with image data from the external host system 160. For example, the display driving control signals may include a vertical sync signal, a horizontal sync signal, an input data enable signal, a clock signal, and the like. The controller 140 can generate several types of control signals such as data driving control signals DCS, gate driving control signals GCS, and the like based on the display driving control signals received from the host system 160, and output the generated control signals (DCS and GCS) to the data driving circuit 120 and the gate driving circuit 130.

The controller 140 may be implemented in a separate component from the data driving circuit 120, or integrated with the data driving circuit 120, so that the timing controller 140 and the data driving circuit 120 can be implemented in a single integrated circuit.

The data drive circuit 120 can drive a plurality of data lines DL by receiving image data DATA from the controller 140 and supplying data voltages to the plurality of data lines DL. The data driving circuit 120 may also be referred to as a source driving circuit.

The data drive circuit 120 may include one or more source driver integrated circuits (SDIC).

The gate driving circuit 130 can output a gate signal with a turn-on voltage level or a gate signal with a turn-off voltage level by the control of the controller 140. The gate driving circuit 130 can sequentially drive a plurality of gate lines GL by sequentially supplying gate signals with the turn-on voltage level to the plurality of gate lines GL.

In one or more aspects, each source driver integrated circuit SDIC and the gate driving circuit 130 may be connected to the display panel 110 by a tape-automated-bonding (TAB) technique, or connected to a conductive pad such as a bonding pad of the display panel 110 by a chip-on-glass (COG) technique or a chip-on-panel (COP) technique, or connected to the display panel 110 by a chip-on-film (COF) technique.

In one or more aspects, the gate driving circuit 130 included in the display device 100 may be disposed in the non-display area NDA of the display panel 110 by a gate-in-panel (GIP) technique. The gate driving circuit 130 may be disposed on a substrate SUB, or connected to the substrate SUB.

The gate driving circuit 130 may include a plurality of stages, and each of the plurality of stages can supply at least one gate signal to at least corresponding one subpixel among a plurality of subpixels SP.

In the example where the gate driving circuit 130 is implemented by the gate-in-panel (GIP) technique, each of the plurality of stages may be configured with a plurality of GIP circuits.

In one or more aspects, at least one of the data driving circuit 120 and the gate driving circuit 130 may be disposed in the display area DA. When one or more specific gate line are driven by the gate driving circuit 130, the data driving circuit 120 can convert image data DATA received from the controller 140 into analog data voltages and supplies the resulted data voltages to a plurality of data lines DL.

The power management circuit 150 may include a plurality of voltage conversion circuits, and a plurality of driving voltage supply circuits each connected to a corresponding one of the plurality of voltage conversion circuits. For example, each of the plurality of driving voltage supply circuits can supply a corresponding driving voltage to at least one of the display panel 110, the data driving circuit 120, the gate driving circuit 130, and the controller 140.

For example, a first driving voltage supply circuit among the plurality of driving voltage supply circuits may be configured to supply a first driving voltage to the data driving circuit 120. In this example, the power management circuit 150 can cause the first driving voltage supply circuit to be deactivated during at least one first sub-frame in at least one frame corresponding to image data DATA.

Further, a second driving voltage supply circuit among the plurality of driving voltage supply circuits may be configured to supply a second driving voltage to the data driving circuit 120. In this example, the power management circuit 150 can cause the second driving voltage supply circuit to be deactivated during at least one second sub-frame in at least one frame corresponding to image data DATA.

For example, the first sub-frame may be an anode reset frame, and the second sub-frame may be a refresh frame.

For example, the first driving voltage may be a reference voltage for generating a gamma voltage in the data driving circuit 120, and the second driving voltage may be a parking voltage VPARK supplied to a plurality of data lines DL during at least one first sub-frame in the data driving circuit 120.

Hereinafter, the first driving voltage supply circuit may be described as a reference voltage supply circuit, and the second driving voltage supply circuit may be described as a parking voltage supply circuit.

In one or more aspects, the first driving voltage supply circuit may include a first reference voltage supply circuit configured to generate a reference voltage with a high voltage level VREF_H and supply the generated reference voltage with the high voltage level VREF_H to the data driving circuit 120, and a second reference voltage supply circuit configured to generate the reference voltage with a low voltage level VREF_L and supply the generated reference voltage with the low voltage level VREF_L to the data driving circuit 120.

However, aspects of the present disclosure are not limited thereto. For example, a single circuit (e.g., the first driving voltage supply circuit) may be employed, and in this example, the first driving voltage supply circuit can generate and supply both the reference voltage with the high voltage level VREF_H and the reference voltage with the low voltage level VREF_L.

In one or more aspects, the first voltage conversion circuit connected to the first driving voltage supply circuit among the plurality of driving voltage supply circuits in the power management circuit 150 can output voltages with different levels by changing a voltage in at least one first sub-frame and at least one second sub-frame. In this implementation, the display device 100, the power management circuit 150, or the first voltage conversion circuit may operate in a force continuous current mode (FCCM) during a corresponding voltage changing period.

In one or more aspects, the display device 100 may be a display including a backlight unit such as a liquid crystal display or the like, or be a self-emissive display such as an organic light emitting diode (OLED) display, a quantum dot display, a micro light emitting diode display, or the like.

In one or more aspects, the display panel 110 may have a top emission structure, a bottom emission structure, or a double-sided emission structure.

Figure 2:
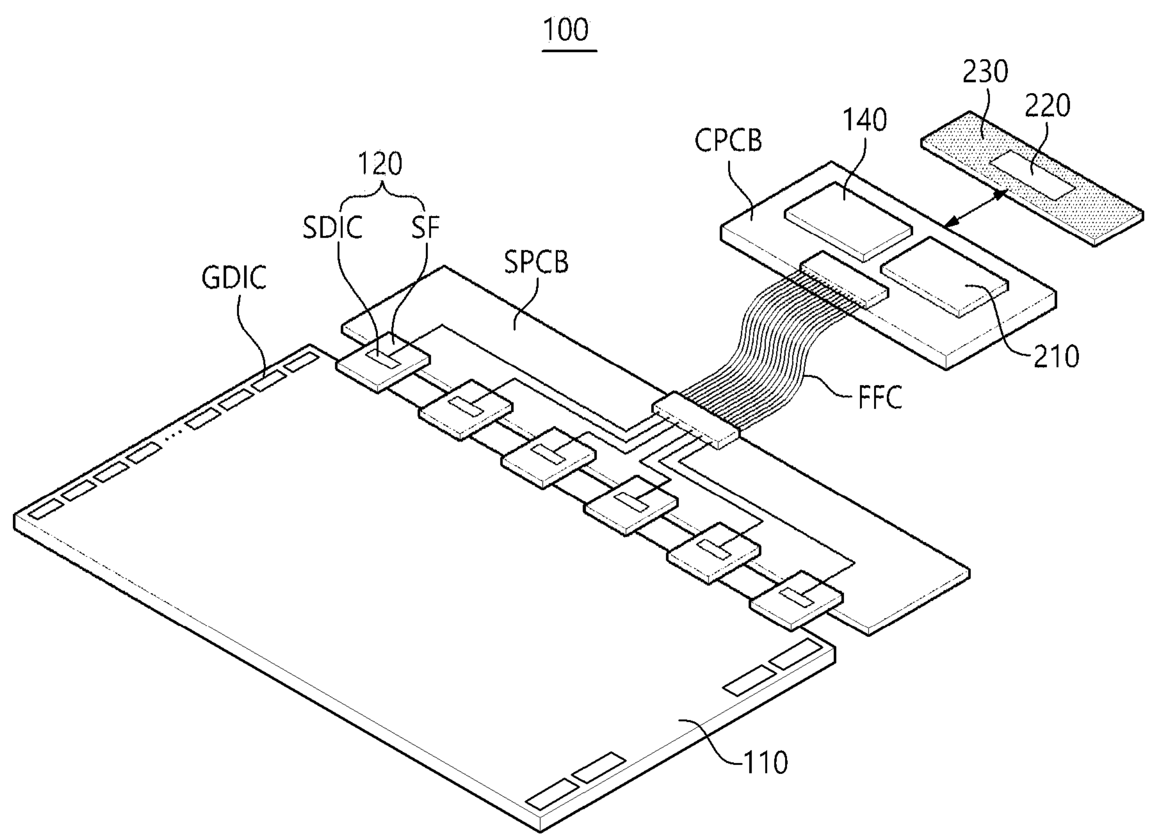
FIG. 2 illustrates an example configuration of the display device according to aspects of the present disclosure.

FIG. 2 illustrates an example configuration of the display device 100 according to aspects of the present disclosure.

Referring to FIG. 2, in one or more example embodiments, the data driving circuit 120 and the gate driving circuit 130 included in the display device 100 may be implemented by the chip-on-film (COF) technique and the gate-in-panel (GIP) technique, respectively. However, aspects of the present disclosure are not limited thereto.

In the example where the gate driving circuit 130 is implemented by the GIP technique, a plurality of gate driving integrated circuits GDIC included in the gate driving circuit 130 may be disposed directly in the non-display area NDA of the display panel 110. In one or more aspects, one or more source driving integrated circuits SDIC included in the data driving circuit 120 may be mounted on one or more respective source films SF, and one side of each source film SF may be electrically connected to the display panel 110.

FIG. 2 illustrates that the display device 100 includes a plurality of source films SF and a plurality of source driving integrated circuits SDIC disposed on the plurality of source films SF respectively, but aspects of the present disclosure are not limited thereto. For example, the display device 100 may include one source film SF and one source driving integrated circuit SDIC disposed on the one source film SF.

In one or more aspects, the other side of each source film SF on which a corresponding source driver integrated circuit SDIC is mounted may be connected to at least one source printed circuit board SPCB. For example, one side of each source film SF on which a corresponding source driving integrated circuit SDIC is mounted may be electrically connected to the display panel 110, and the other side thereof may be electrically connected to the at least one source printed circuit board SPCB.

The controller 140 and a sub-power control circuit 210 may be mounted on a control printed circuit board CPCB. The controller 140 can control operations of the data driving circuit 120 and the gate driving circuit 130. The sub-power control circuit 210 can supply various levels of voltages or currents to the display panel 110, the gate driving circuit 130, the data driving circuit 120, and the like, or control the levels of voltages or currents to be supplied.

The at least one source printed circuit board SPCB and the control printed circuit board CPCB may be electrically connected to each other through at least one connector, such as a flexible printed circuit FPC, a flexible flat cable FFC, and/or the like. In one or more aspects, the at least one source printed circuit board SPCB and the control printed circuit board CPCB may be integrated into one printed circuit board.

The display device 100 may further include a set board 230 electrically connected to the control printed circuit board CPCB. The set board 230 may be referred to as a power board. A main power management circuit 220 configured to manage the whole power of the display device 100 may be mounted on the set board 230. The main power management circuit 220 may interoperate with the sub-power control circuit 210.

In one or more aspects, the power management circuit 150 may include at least one of the sub-power control circuit 210 and the main power management circuit 220.

Figure 3:
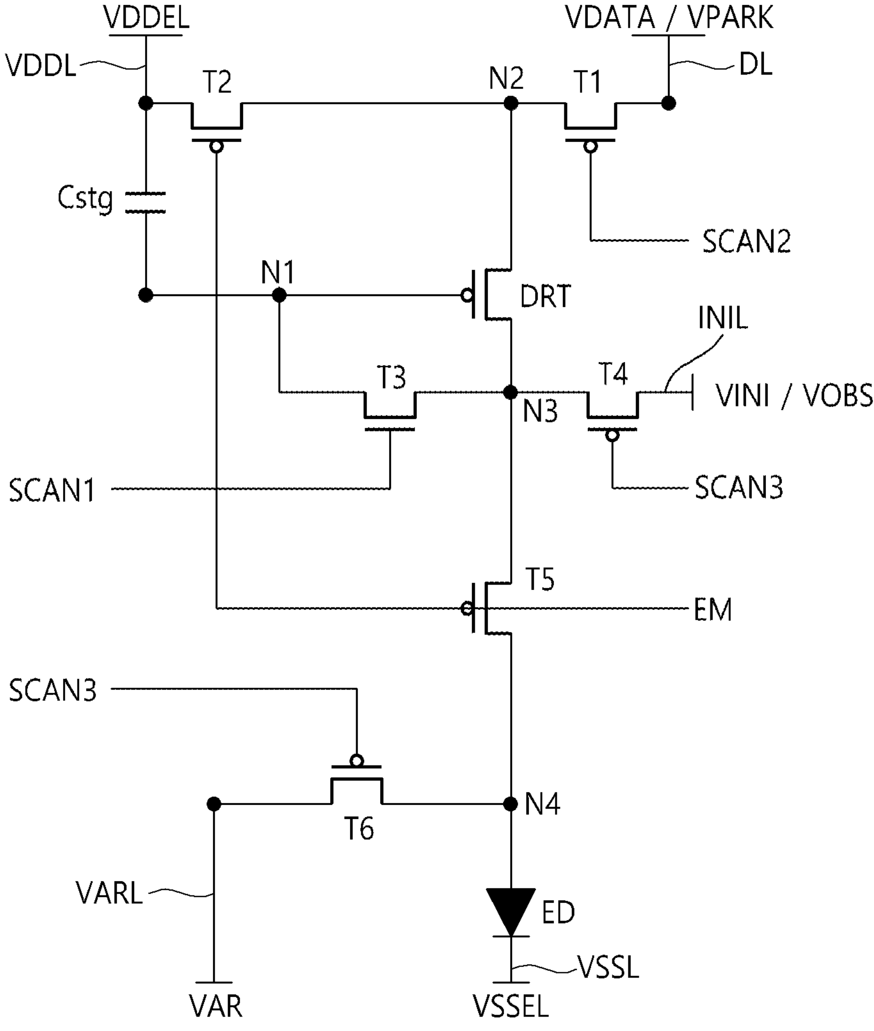
FIG. 3 is an example circuit configuration of a subpixel in the display device according to aspects of the present disclosure.

FIG. 3 is an example circuit configuration of a subpixel SP in the display device 100 according to aspects of the present disclosure.

Referring to FIG. 3, in one or more example embodiments, the subpixel SP may include a light emitting element ED and a driving transistor DRT configured to drive the light emitting element ED. For example, the light emitting element ED may be a self-emissive light emitting element, such as an organic light emitting diode, or the like. However, aspects of the present disclosure are not limited thereto. For example, the light emitting element ED may be an inorganic light emitting diode, a quantum dot light emitting diode, a micro light emitting diode, a mini light emitting diode, or the like.

The light emitting element ED may include a pixel electrode, a common electrode, and an emission layer located between the pixel electrode and the common electrode.

The pixel electrode of the light emitting element ED may be an electrode disposed for each subpixel SP, and the common electrode may be an electrode commonly disposed for all or some of a plurality subpixels SP. For example, the pixel electrode may be an anode electrode and the common electrode may be a cathode electrode. In another example, the pixel electrode may be a cathode electrode and the common electrode may be an anode electrode.

Referring to FIG. 3, the pixel electrode of the light emitting element ED may be connected to a fourth node N4, and the common electrode thereof may be connected to a low driving voltage line VSSL for delivering a low driving voltage VSSEL.

The subpixel SP may further include one or more transistors in addition to the driving transistor DRT. Referring to FIG. 3, the subpixel SP may further include first to sixth transistors (T1 to T6).

The subpixel SP may further include a storage capacitor Cstg configured to apply a high driving voltage VDDEL delivered through a high driving voltage line VDDL to a gate node of the driving transistor DRT for one frame period.

The storage capacitor Cstg may include one end (or electrode) electrically connected to a first node N1, and the other end (or electrode) electrically connected to the high driving voltage line VDDL.

FIG. 3 illustrates a subpixel SP with a 7T1C structure, but aspects of the present disclosure are not limited thereto. For example, the subpixel may be configured with various circuit structures, such as a 2T1C structure, a 3T1C structure, an 8TO2 structure in which two of the eight transistors are oxide transistors, and the like.

The driving transistor DRT may include the first node N1, a second node N2, and a third node N3. For example, the first node N1 may be the gate node of the driving transistor DRT, the second node N2 may be a source or drain node of the driving transistor DRT, and the third node N3 may be the drain or source node of the driving transistor DRT.

The first transistor T1 can receive a second scan gate signal SCAN2 with a turn-on voltage level supplied by the gate driving circuit 130, and control a connection between the second node N2 and a data line DL.

For example, the data line DL may be supplied with a parking voltage VPARK during a first sub-frame (e.g., an anode reset frame), and be supplied with a data voltage VDATA during a second sub-frame (e.g., a refresh frame).

The second transistor T2 can receive an emission control gate signal EM with a turn-on voltage level supplied by the gate driving circuit 130, and control a connection between the second node N2 and the high driving voltage line VDDL.

The third transistor T3 can receive a first scan gate signal SCAN1 with a turn-on voltage level supplied by the gate driving circuit 130, and control a connection between the first node N1 and the third node N3.

The fourth transistor T4 can receive a third scan gate signal SCAN3 with a turn-on voltage level supplied by the gate driving circuit 130, and control a connection between the third node N3 and an initialization voltage line INIL.

For example, at least one voltage of an initialization voltage VINI and a bias voltage VOBS with a higher voltage level than the initialization voltage VINI may be supplied to the initialization voltage line INIL.

The fifth transistor T5 can receive the emission control gate signal EM with the turn-on voltage level supplied by the gate driving circuit 130, and control a connection between the third node N3 and the fourth node N4 connected to the pixel electrode of the light emitting element ED.

The sixth transistor T6 can receive the third scan gate signal SCAN3 with the turn-on voltage level supplied by the gate driving circuit 130, and control a connection between the fourth node N4 and a reset voltage line VARL for delivering an anode reset voltage VAR.

Referring to FIG. 3, the fourth transistor T4 and the sixth transistor T6 may be provided with the third scan gate signal SCAN3 through one gate line GL.

In one or more aspects, the fourth transistor T4 and the sixth transistor T6 may be provided with the third scan gate signal SCAN3 through different gate lines GL.

For example, when the subpixel SP of FIG. 3 is an $n^{th}$ subpixel (wherein n is an integer equal to or greater than 1), the fourth transistor T4 may receive the third scan gate signal SCAN3 through a gate line GL connected to an $n^{th}$ stage among a plurality of stages in the gate driving circuit 130, and the sixth transistor T6 may receive the third scan gate signal SCAN3 through a gate line GL connected to an $(n+1)^{th}$ stage among the plurality of stages therein.

In one or more aspects, a second initialization voltage VAR2 may be applied to the initialization voltage line INIL during a first sub-frame (e.g., an anode reset frame), and a first initialization voltage VAR1 with a higher voltage level than the second initialization voltage VAR2 may be applied during a second sub-frame (e.g., a refresh frame). However, aspects of the present disclosure are not limited thereto.

The respective turn-on voltage levels of the first scan gate signal SCAN1, the second scan gate signal SCAN2, the third scan gate signal SCAN3, and the emission control gate signal EM may be high voltage levels when the transistors to which these gate signals are applied are n-type transistors, and be low voltage levels when the transistors are p-type transistors.

Referring to FIG. 3, for example, the driving transistor DRT, the first transistor T1, the second transistor T2, and the fourth to sixth transistors (T4 to T6) may be p-type transistors, and the third transistor T3 may be an n-type transistor. However, aspects of the present disclosure are not limited thereto. For example, the third transistor T3 may be a p-type transistor, or at least one of the driving transistor DRT, the first transistor T1, the second transistor T2, and the fourth to sixth transistors (T4 to T6) may be an n-type transistor.

In one or more aspects, the third transistor T3 may be an oxide transistor, and the driving transistor DRT, the first transistor T1, the second transistor T2, and the fourth to sixth transistors (T4 to T6) may be low-temperature polycrystalline silicon (LTPS) transistors. However, aspects of the present disclosure are not limited thereto. For example, the third transistor T3 may be an LTPS transistor, or at least one of the driving transistor DRT, the first transistor T1, the second transistor T2, and the fourth to sixth transistors (T4 to T6) may be an oxide transistor.

Figure 4:
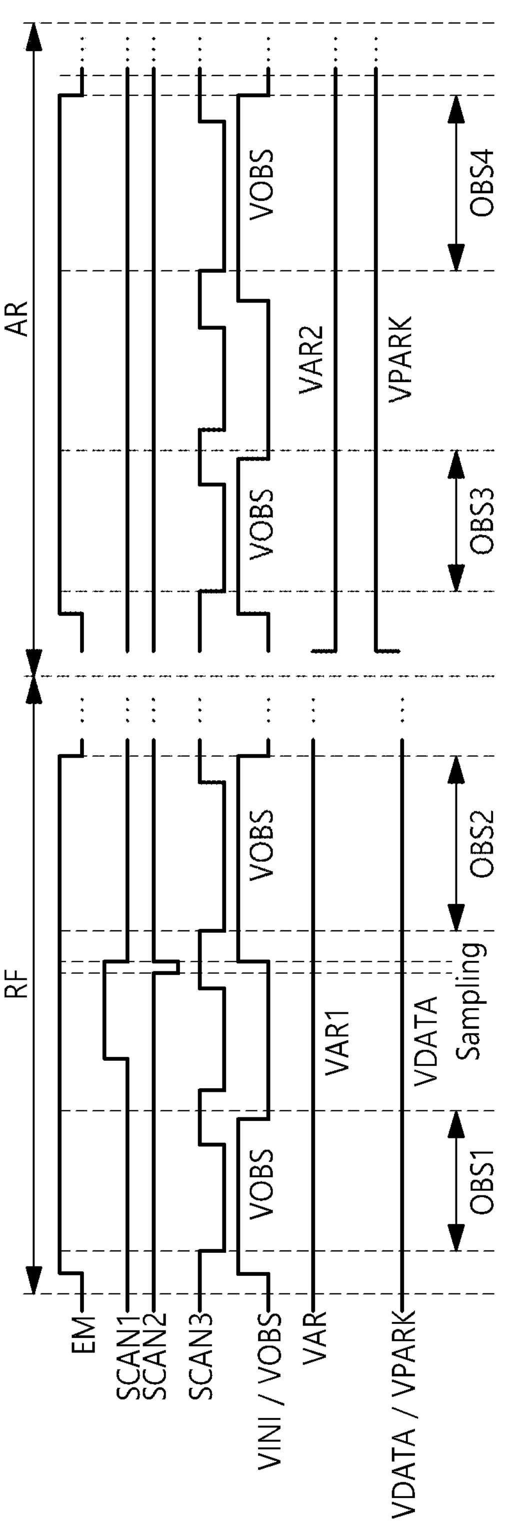
FIG. 4 illustrates an example operation timing diagram of a subpixel in a refresh frame and an anode reset frame in the display device according to aspects of the present disclosure.

FIG. 4 illustrates an example operation timing diagram of a subpixel in a refresh frame RF and an anode reset frame AR in the display device 100 according to aspects of the present disclosure.

Referring to FIGS. 3 and 4, in one or more example embodiments, the period of a refresh frame RF may include a first on-bias sub-period OBS1 and a second on-bias sub-period OBS2 set to apply a high voltage level bias voltage VOBS to the third node N3 of the driving transistor DRT, and a sampling sub-period Sampling set to apply a data voltage VDATA to the second node N2 of the driving transistor DRT.

In addition, the period of an anode reset frame AR may include a third on-bias sub-period OBS3 and a fourth on-bias sub-period OBS4 set to apply a high voltage level bias voltage VOBS to the third node N3 of the driving transistor DRT.

For example, the on-bias sub-periods (OBS1, OBS2, OBS3, and OBS4) may be periods set to alleviate a hysteresis effect that may occur in the driving transistor DRT and to improve response characteristics.

Referring to FIGS. 3 and 4, for example, a bias voltage VOBS may be applied to the initialization voltage line INIL during the on-bias sub-periods (OBS1, OBS2, OBS3, and OBS4) within the period of each of the refresh frame RF and the anode reset frame AR, and an initialization voltage VINI may be applied to the initialization voltage line INIL during the remaining sub-periods except for the on-bias sub-periods (OBS1, OBS2, OBS3, and OBS4).

During the sampling sub-period Sampling, an emission control gate signal EM with a turn-off voltage level may be applied to the second transistor T2 and the fifth transistor T5, and a third scan gate signal SCAN3 with a turn-off voltage level may be applied to the fourth transistor T4 and the sixth transistor T6.

During the sampling sub-period Sampling, a first scan gate signal SCAN1 with a turn-on voltage level may be applied to the third transistor T3, and a second scan gate signal SCAN2 with a turn-on voltage level may be applied to the first transistor T1.

For example, when the driving transistor DRT, the first transistor T1, and the third transistor T3 are turned on during the sampling sub-period Sampling, a data voltage VDATA may be supplied to the second node N2 of the driving transistor DRT, and thereby, a voltage corresponding to the data voltage VDATA may be supplied to one end (or electrode) of the storage capacitor Cstg.

In a situation where the second transistor T2 and the fifth transistor T5 are turned off during the period of the anode reset frame AR, a first scan gate signal SCAN1 with a turn-off voltage level may be applied to the third transistor T3, and a second scan gate signal SCAN2 with a turn-off voltage level may be applied to the first transistor T1.

During the period of each of the refresh frame RF and the anode reset frame AR, the third scan gate signal SCAN3 applied to the fourth transistor T4 and the sixth transistor T6 may have a turn-on voltage level at least one time and a turn-off voltage level at least one time.

In response to the third scan gate signal SCAN3, the fourth transistor T4 can be turned on, and a bias voltage VOBS with a high voltage level may be applied to the third node N3 of the driving transistor DRT.

The sixth transistor T6 can be turned on in response to the third scan gate signal SCAN3, and an anode reset voltage VAR may be applied to the pixel electrode (e.g., the anode electrode) of the light emitting element ED.

Referring to FIGS. 3 and 4, a first initialization voltage VAR1 may be applied to the initialization voltage line INIL during the period of the refresh frame RF, and a second initialization voltage VAR2 with a lower voltage level than the first initialization voltage VAR1 may be applied to the initialization voltage line INIL during the period of the anode reset frame AR. However, aspects of the present disclosure are not limited thereto.

In one or more aspects, a data voltage VDATA may be applied to the data line DL during the period of the refresh frame RF, and a parking voltage VPARK may be applied to the data line DL during the period of the anode reset frame AR.

Referring to FIG. 4, the parking voltage VPARK may be designed to have a higher voltage level than the data voltage VDATA.

Figure 5:
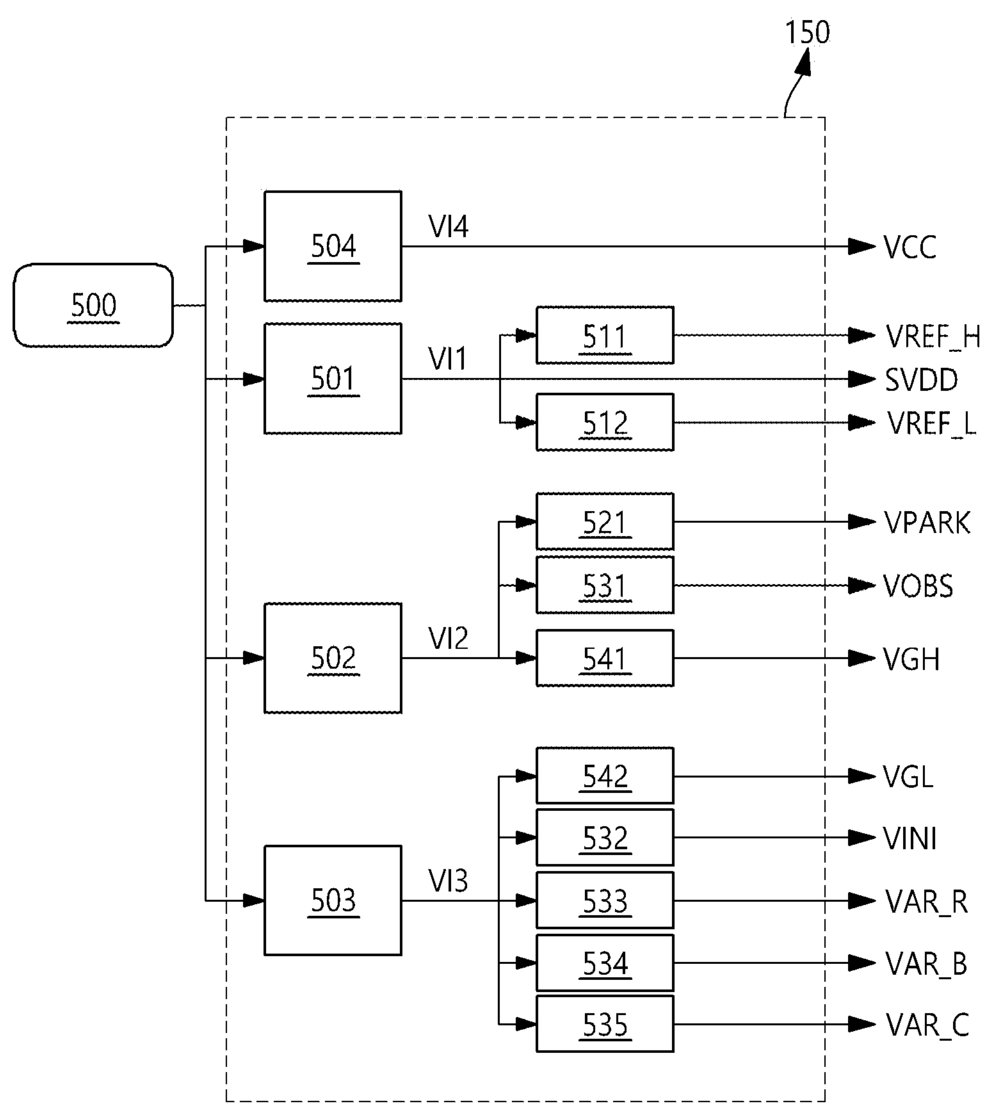
FIG. 5 illustrates an example power management circuit according to aspects of the present disclosure.

FIG. 5 illustrates an example configuration of the power management circuit 150 according to aspects of the present disclosure.

Referring to FIG. 5, in one or more example embodiments, the power management circuit 150 may include a first voltage conversion circuit 501 configured to convert an initial voltage supplied by a system power supply 500 into a first input voltage VI1, a second voltage conversion circuit 502 configured to convert the initial voltage into a second input voltage VI2, a third voltage conversion circuit 503 configured to convert the initial voltage into a third input voltage VI3, and a fourth voltage conversion circuit 504 configured to convert the initial voltage into a fourth input voltage VI4.

FIG. 5 illustrates that the system power supply 500 configured to supply the initial voltage is disposed outside of the power management circuit 150, but aspects of the present disclosure are not limited thereto. For example, the system power supply 500 and the power management circuit 150 may be integrated into a single circuit.

The first voltage conversion circuit 501 can supply the first input voltage VI1 with a first voltage level during the refresh frame RF, and can supply the first input voltage VI1 with a second voltage level lower than the first voltage level by changing the first voltage level of the first input voltage VI1 to the second voltage level during the anode reset frame AR. Thereby, the power management circuit 150 can provide an advantage of reducing power consumption.

The second voltage conversion circuit 502 can supply the second input voltage VI2 with a third voltage level higher than the first voltage level during the refresh frame RF and the anode reset frame AR. The third voltage conversion circuit 503 can supply the third input voltage VI3 with a fourth voltage level lower than the second voltage level. The fourth voltage conversion circuit 504 can supply the fourth input voltage VI4 with a fifth voltage level higher than the third voltage level.

For example, the first input voltage VI1 may be a source driving voltage SVDD, and the first voltage conversion circuit 501 may directly supply the source driving voltage SVDD to the data driving circuit 120.

For example, the fourth input voltage VI4 may be a power supply voltage VCC, and the fourth voltage conversion circuit 504 may directly supply the power supply voltage VCC to the data driving circuit 120 and the controller 140.

The first voltage conversion circuit 501 may operate in a force continuous current mode (FCCM) during a first voltage changing period where the first input voltage VI1 is changed from the first voltage level to the second voltage level and a second voltage changing period where the first input voltage VI1 is changed from the second voltage level to the first voltage level, based on a mode control signal received from the controller 140. Thereby, the power management circuit 150 can provide an advantage of reducing occurrence of a time delay while the first input voltage VI1 is changed.

Each of the first voltage conversion circuit 501, the second voltage conversion circuit 502, the third voltage conversion circuit 503, and the fourth voltage conversion circuit 504 may include at least one of a buck converter, a boost converter, and a buck-boost converter.

Referring to FIG. 5, the power management circuit 150 may further include a first driving voltage supply circuit (511 and 512) configured to receive the first input voltage VI1 and generate a reference voltage (VREF_H or VREF_L) as a first driving voltage, and a second driving voltage supply circuit 521 configured to receive the second input voltage VI2 and generate a parking voltage VPARK as a second driving voltage.

In addition, the power management circuit 150 may further include at least one third driving voltage supply circuit (531, 532, 533, 534, and/or 535) configured to receive a corresponding one of the second input voltage VI2 and the third input voltage VI3 and generate a third driving voltage.

In addition, the power management circuit 150 may further include at least one fourth driving voltage supply circuit (541 and/or 542) configured to receive a corresponding one of the second input voltage VI2 and the third input voltage VI3 and generate a fourth driving voltage.

For example, the third driving voltage may be a DC voltage directly supplied to subpixels, and the fourth driving voltage may be a DC voltage supplied to the gate driving circuit 130.

The first driving voltage supply circuit (511 and 512) may include a first reference voltage supply circuit 511 configured to generate a reference voltage with a high voltage level VREF_H and supply the generated reference voltage with the high voltage level VREF_H to the data driving circuit 120, and a second reference voltage supply circuit 512 configured to generate the reference voltage with a low voltage level VREF_L and supply the generated reference voltage with the low voltage level VREF_L to the data driving circuit 120.

The power management circuit 150 can deactivate the first reference voltage supply circuit 511 and the second reference voltage supply circuit 512 during the period of the anode reset frame AR. Thereby, the power management circuit 150 can provide an advantage of reducing power consumption.

The second driving voltage supply circuit 521 can generate a parking voltage VPARK based on the second input voltage VI2 and supply the generated parking voltage VPARK to the data driving circuit 120.

The power management circuit 150 can deactivate the second driving voltage supply circuit 521 during the period of the refresh frame RF. Thereby, the power management circuit 150 can provide an advantage of reducing power consumption.

The third driving voltage may be a voltage supplied to a source or drain node of at least one transistor included in each of the plurality of subpixels SP, and may include at least one of a bias voltage VOBS, an initialization voltage *VINI*, and an anode reset voltage VAR.

The at least one third driving voltage supply circuit may include a bias voltage supply circuit 531, an initialization voltage supply circuit 532, and at least one reset voltage supply circuit (533, 534, and/or 535).

The bias voltage supply circuit 531 can receive the second input voltage VI2 and generate a bias voltage VOBS, and supply the generated bias voltage VOBS to a fourth transistor T4 of a subpixel SP through an initialization voltage line INIL (see the configuration of FIG. 4).

The initialization voltage supply circuit 532 can receive the third input voltage VI3 and generate an initialization voltage VINI, and supply the generated initialization voltage VINI to the fourth transistor T4 of the subpixel SP through the initialization voltage line INIL at a different time from a time at which the bias voltage VOBS is supplied.

The at least one reset voltage supply circuit (533, 534, and/or 535) can receive the third input voltage VI3 and generate an anode reset voltage VAR, and supply the generated anode reset voltage VAR to a sixth transistor T6 of the subpixel SP through a reset voltage line VARL (see the configuration of FIG. 4).

In one or more aspects, the power management circuit 150 can reduce power consumption by deactivating the initialization voltage supply circuit 532 during the period of the anode reset frame AR, but aspects of the present disclosure are not limited thereto.

Referring to FIG. 5, the at least one reset voltage supply circuit (533, 534, and/or 535) may include a first reset voltage supply circuit 533, a second reset voltage supply circuit 534, and a third reset voltage supply circuit 535, which may correspond to subpixels SP of different colors, but aspects of the present disclosure are not limited thereto.

The first reset voltage supply circuit 533 can supply an anode reset voltage VAR_R corresponding to a first color (e.g., red) to subpixels SP of the first color.

The second reset voltage supply circuit 534 can supply an anode reset voltage VAR_B corresponding to a second color (e.g., blue) to subpixels SP of the second color.

The third reset voltage supply circuit 535 can supply an anode reset voltage VAR_G corresponding to a third color (e.g., green) to subpixels SP of the third color.

In one or more aspects, the at least one reset voltage supply circuit (533, 534, and/or 535) may supply anode reset voltages VAR with different voltage levels in each of the refresh frame RF and the anode reset frame AR.

The fourth driving voltage may be a voltage supplied to the gate driving circuit 130, and include at least one of a gate high voltage VGH and a gate low voltage VGL.

Referring to FIG. 5, the at least one fourth driving voltage supply circuit may include a first gate supply circuit 541 and a second gate supply circuit 542.

The first gate supply circuit 541 can receive the second input voltage VI2 and generate a gate high voltage VGH, and supply the generated gate high voltage VGH to the gate driving circuit 130.

The second gate supply circuit 542 can receive the third input voltage VI3 and generate a gate low voltage VGL, and supply the generated gate low voltage VGL to the gate driving circuit 130.

The gate driving circuit 130 can generate a gate signal to be supplied to a corresponding gate node of at least one transistor in a plurality of subpixels SP through gate lines GL based on the gate high voltage VGH and the gate low voltage VGL.

Referring to FIG. 3, the gate signal may include the first scan gate signal SCAN1, the second scan gate signal SCAN2, the third scan gate signal SCAN3, and the emission control gate signal EM.

In one or more aspects, the at least one fourth driving voltage supply circuit (541 and/or 542) may supply gate high voltages VGH with different voltage levels and gate low voltages VGL with different voltage levels to the gate driving circuit 130.

For example, the gate driving circuit 130 can generate the first to third scan gate signals (SCAN1 to SCAN3) using a first gate high voltage and a first gate low voltage supplied by the at least one fourth driving voltage supply circuit (541 and/or 542), and generate the emission control gate signal EM using a second gate high voltage and a second gate low voltage supplied by the at least one fourth driving voltage supply circuit (541 and/or 542)

In addition, the gate driving circuit 130 can generate a gate signal (e.g., SCAN1) for controlling one or more oxide transistors in a subpixel SP using the first gate high voltage and the first gate low voltage, and can generate gate signals (e.g., SCAN2, SCAN3, and EM) for controlling one or more LTPS transistors in the subpixel SP using the second gate high voltage and the second gate low voltage.

However, aspects of the present disclosure are not limited thereto. For example, the first to third scan gate signals (SCAN1 to SCAN3) and the emission control gate signal EM may be generated using one gate high voltage VGH and one gate low voltage VGL.

FIGS. 6 to 10 illustrate example voltage conversion circuits included in the power management circuit 150 according to aspects of the present disclosure.

Figure 6:
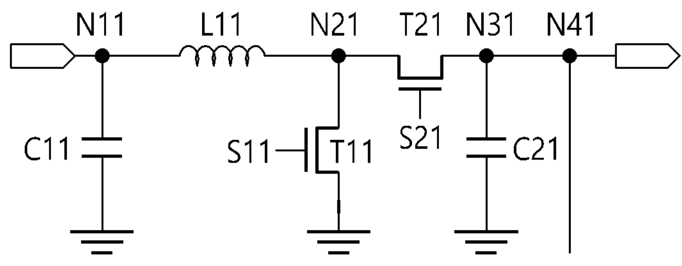
FIGS. 6 to 10 illustrate example voltage conversion circuits included in the power management circuit according to aspects of the present disclosure.
Figure 7:
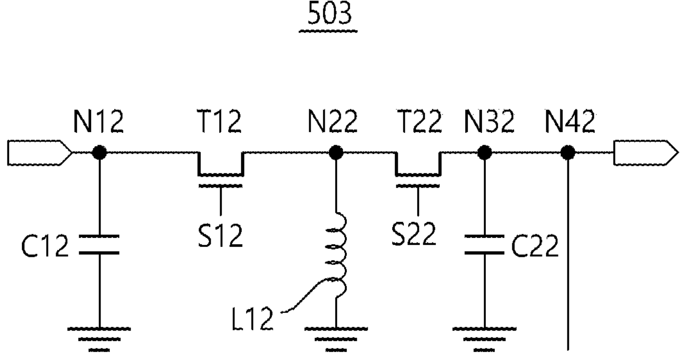
Figure 8:
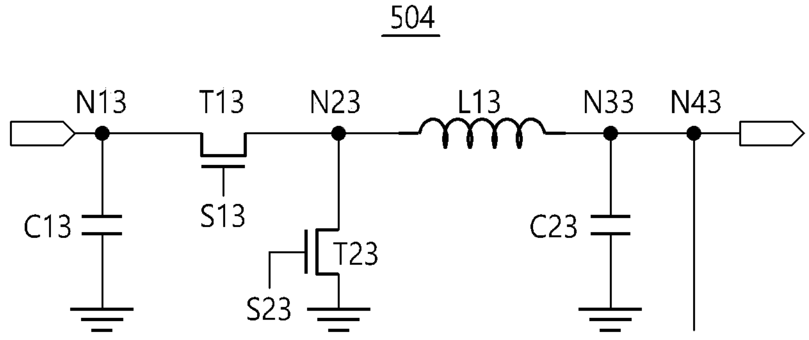

FIG. 6 illustrates an example configuration of the first voltage conversion circuit 501 and the second voltage conversion circuit 502. FIG. 7 illustrates an example configuration of the third voltage conversion circuit 503. FIG. 8 illustrates an example configuration of the fourth voltage conversion circuit 504.

Figure 9:
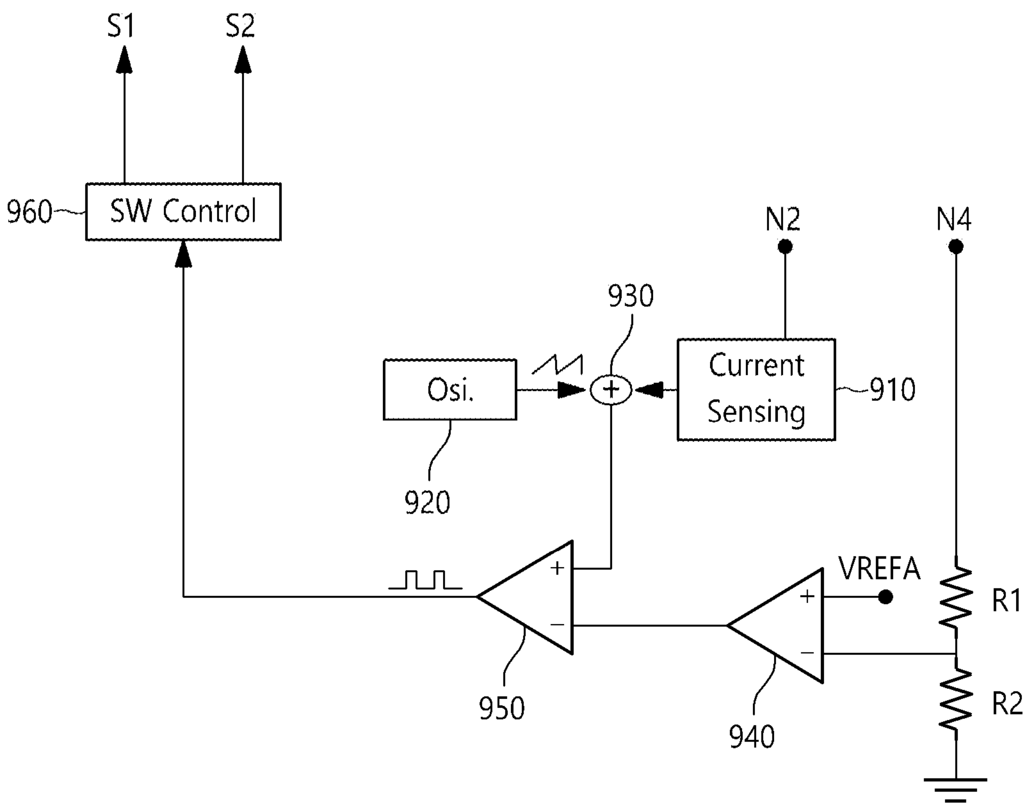
Figure 10:
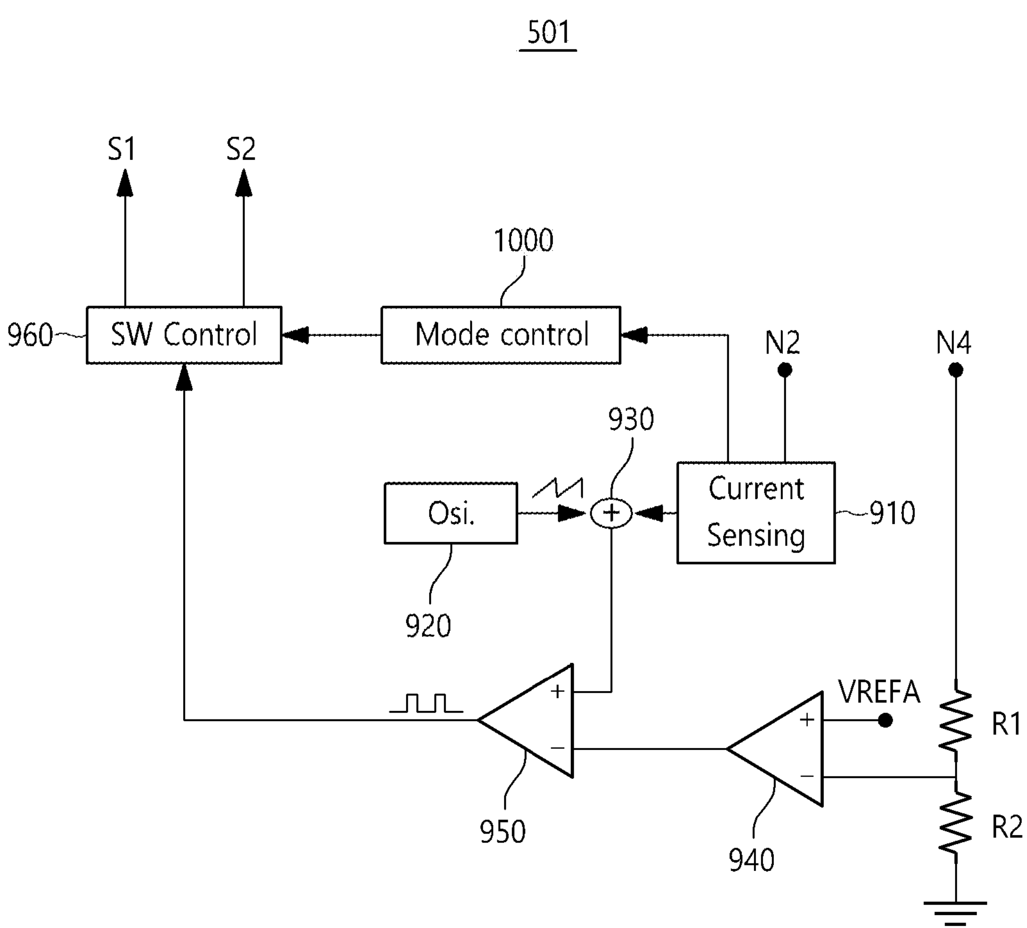

FIG. 9 illustrates an example control circuit included in each of the second voltage conversion circuit 502, the third voltage conversion circuit 503, and the fourth voltage conversion circuit 504 illustrated in FIGS. 6 to 8. FIG. 10 illustrates an example control circuit included in the first voltage conversion circuit 501 of FIG. 6.

Referring to FIG. 6, in one or more example embodiments, each of the first voltage conversion circuit 501 and the second voltage conversion circuit 502 may include a first capacitor C11 connected to a first node N11 to which an initial voltage from the system power supply 500 is applied, an inductor L11 connected to the first node N11 and a second node N21, a first transistor T11 connected to the second node, a second transistor T21 connected to the second node N21 and a third node N31, and a second capacitor C21 connected to the third node N31.

Referring to FIG. 6, each of the first voltage conversion circuit 501 and the second voltage conversion circuit 502 may be a boost converter configured to cause the first transistor T11 and the second transistor T21 to be alternately turned on and thereby output a DC voltage (e.g., a first input voltage VI1 or a second input voltage VI2) in which an input voltage is boosted.

Referring to FIG. 7, in one or more example embodiments, the third voltage conversion circuit 503 may include a first capacitor C12 connected to a first node N12 to which an initial voltage is applied, a first transistor T12 connected to the first node N12 and a second node N22, an inductor L12 connected to the second node N22, a second transistor T22 connected to the second node N22 and a third node N32, and a second capacitor C22 connected to the third node N32.

Referring to FIG. 7, the third voltage conversion circuit 503 may be a buck-boost converter configured to cause the first transistor T12 and the second transistor T22 to be alternately turned on and thereby output a DC voltage (e.g., a third input voltage VI3) in which an input voltage is boosted or lowered.

In one or more aspects, the third voltage conversion circuit 503 can output a DC voltage with a reversed polarity with respect to the input voltage. For example, the third voltage conversion circuit 503 can output a DC voltage that is a negative voltage (i.e., − voltage) by pulling down an input voltage that is a positive voltage (i.e., + voltage).

Referring to FIG. 8, in one or more example embodiments, the fourth voltage conversion circuit 504 may include a first capacitor C13 connected to a first node N13 to which an initial voltage is applied, a first transistor T13 connected to the first node N13 and a second node N23, a second transistor T23 connected to the second node N23, an inductor L13 connected to the second node N23 and a third node N33, and a second capacitor C23 connected to the third node N33.

Referring to FIG. 8, the fourth voltage conversion circuit 504 may be a buck converter configured to cause the first transistor T13 and the second transistor T23 to be alternately turned on and thereby output a DC voltage (e.g., a fourth input voltage VI4) in which an input voltage is lowered.

Referring to FIGS. 9 and 10, in one or more example embodiments, each of the first voltage conversion circuit 501, the second voltage conversion circuit 502, the third voltage conversion circuit 503, and the fourth voltage conversion circuit 504 may include a current sensing circuit 910, an oscillator 920, an adder 930, a first resistor R1, a second resistor R2, an error amplifier 940, a comparator 950, and a switching control circuit 960.

The current sensing circuit 910 can detect current at a second node N2 to which a first transistor and a second transistor are connected.

For example, the respective current sensing circuits 910 included in the first voltage conversion circuit 501, the second voltage conversion circuit 502, the third voltage conversion circuit 503, and the fourth voltage conversion circuit 504 can detect currents at the second node N21 of the first voltage conversion circuit 501, the second node N21 of the second voltage conversion circuit 502, the second node N22 of the third voltage conversion circuit 503, and the second node N23 of the fourth voltage conversion circuit 504, respectively.

For example, the current sensing circuit 910 may be an inductor-based current sensing circuit.

The adder 930 can output a signal resulting from reflecting or adding a slope value of a signal output from the current sensing circuit 910 to a triangle wave output from the oscillator 920.

The first resistor R1 and the second resistor R2 can supply a voltage-divided output voltage based on a voltage supplied from a fourth node N4.

For example, the respective first and second resistors (R1 and R2) included in the first voltage conversion circuit 501, the second voltage conversion circuit 502, the third voltage conversion circuit 503, and the fourth voltage conversion circuit 504 can supply voltage-divided output voltages based on voltages supplied from the fourth node N41 of the first voltage conversion circuit 501, the fourth node N41 of the second voltage conversion circuit 502, the fourth node N42 of the third voltage conversion circuit 503, and the fourth node N43 of the fourth voltage conversion circuit 504, respectively.

The error amplifier 940 can supply an error amplification signal based on a preset amplifier reference voltage VREFA and the voltage-divided output voltage provided from the first resistor R1 and the second resistor R2. For example, the error amplification signal may correspond to a signal resulting from amplifying a difference between the amplifier reference voltage VREFA and the voltage-divided output voltage.

For example, the amplifier reference voltage VREFA may include a first amplifier reference voltage applied to a refresh frame RF and a second amplifier reference voltage applied to an anode reset frame AR having a lower voltage level than the first amplifier reference voltage, and the error amplifier 940 may be supplied with a corresponding one of the first amplifier reference voltage and the second amplifier reference voltage based on a control operation of the controller 140.

For example, at least two amplifier reference voltages VREFA among the amplifier reference voltages VREFA input to the respective error amplifiers 940 included in the first voltage conversion circuit 501, the second voltage conversion circuit 502, the third voltage conversion circuit 503, and the fourth voltage conversion circuit 504 may be set to be the same as or different from each other.

The comparator 950 can generate a control pulse based on a comparison result between a triangle wave output from the adder 930 and an error amplification signal output from the error amplifier 940.

The switching control circuit 960 can output a first switching control signal S1 of the first transistor and a switching control signal S2 of the second transistor based on the control pulse output from the comparator 950. For example, each of the first and second switching control signals (S1 and S2) may be supplied to gate nodes of the first and second transistors, respectively.

For example, the switching control circuit 960 can output the first and second switching control signals (S1 and S2) in which at least one of gate voltage levels, turn-on control times, and turn-off control times of the first and second transistors is controlled based on the control pulse.

For example, the respective switching control circuits 960 included in the first voltage conversion circuit 501, the second voltage conversion circuit 502, the third voltage conversion circuit 503, and the fourth voltage conversion circuit 504 can supply first and second switching control signals (S11 and S21) to the first and second transistors (T11 and T21) of the first voltage conversion circuit 501, first and second switching control signals (S11 and S21) to the first and second transistors (T11 and T21) of the second voltage conversion circuit 502, first and second switching control signals (S12 and S22) to the first and second transistors (T12 and T22) of the third voltage conversion circuit 503, and first and second switching control signals (S13 and S23) to the first and second transistors (T13 and T23) of the fourth voltage conversion circuit 504, respectively.

Referring to FIG. 10, the first voltage conversion circuit 501 may further include a mode control circuit 1000. For example, the mode control circuit 1000 can output an force continuous current mode (FCCM) driving signal to the switching control circuit 960 for driving the first voltage conversion circuit 501 in the force continuous current mode (FCCM) during a voltage changing period based on a current detection result of the current sensing circuit 910 and a mode control signal output from the controller 140.

The switching control circuit 960 can output first and second switching control signals (S11 and S21) corresponding to the first transistor T11 and the second transistor T21 based on the force continuous current mode (FCCM) driving signal output from the mode control circuit 1000.

Figure 11:
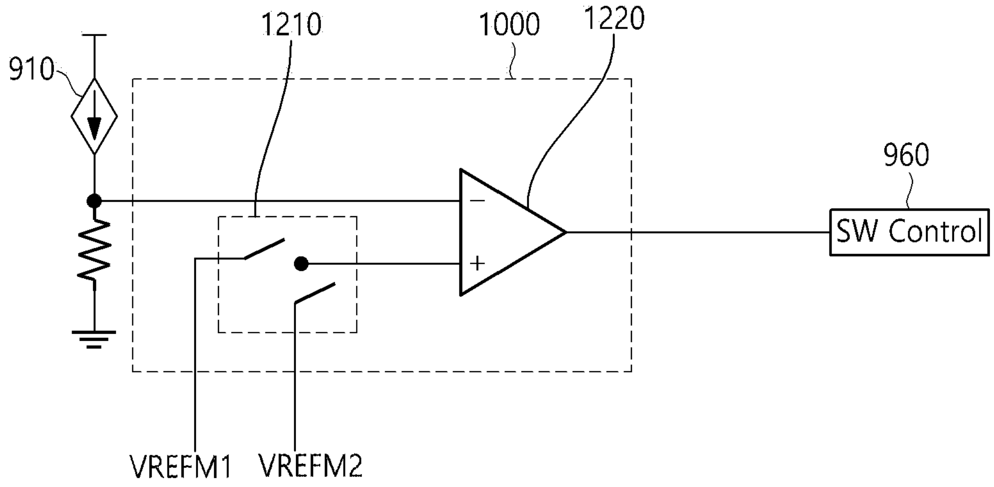
FIGS. 11 to 13 illustrate an example mode control circuit included in the power management circuit according to aspects of the present disclosure.
Figure 12:
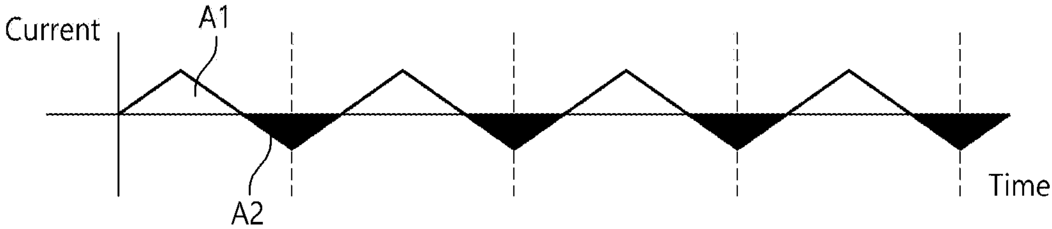
Figure 13:
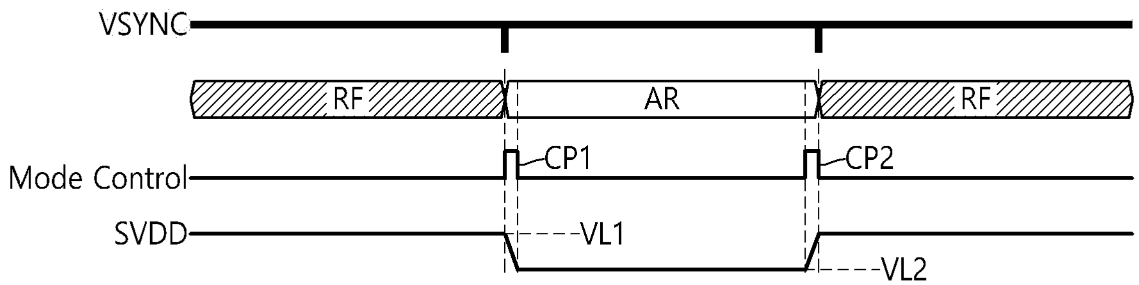

FIGS. 11 to 13 illustrate an example mode control circuit 1000 included in the power management circuit 150 according to aspects of the present disclosure.

FIG. 11 illustrates an example configuration of the mode control circuit 1000, FIG. 12 illustrates an example of a change in current measured at the second node N21 of the first voltage conversion circuit 501 by driving in the force continuous current mode (FCCM). FIG. 13 illustrates an example of a change in a first input voltage VI1, which may be the source driving voltage SVDD output from the first voltage conversion circuit 501 based on a mode control signal.

Referring to FIG. 11, in one or more example embodiments, the mode control circuit 1000 may include a mode reference voltage selector 1210 and a negative current controller 1220.

The mode reference voltage selector 1210 can supply one of a first mode reference voltage VREFM1 applied during normal mode driving and a second mode reference voltage VREFM2 applied during force continuous current mode (FCCM) driving to the negative current controller 1220.

For example, the mode reference voltage selector 1210 can supply one of a first mode reference voltage VREFM1 and a second mode reference voltage VREFM2 to the negative current controller 1220 based on a mode control signal supplied from the controller 140.

For example, the mode reference voltage selector 1210 can output the first mode reference voltage VREFM1 when a mode control signal with a low voltage level output from the controller 140 is received to operate in a normal mode.

Further, the mode reference voltage selector 1210 can output the second mode reference voltage VREFM2 when a mode control signal with a high voltage level output from the controller 140 is received to operate in an force continuous current mode (FCCM).

The negative current controller 1220 can generate an force continuous current mode (FCCM) driving signal based on a mode reference voltage output from the mode reference voltage selector 1210 and an output signal resulting from detecting current at the second node N21 of the first voltage conversion circuit 501 output from the current sensing circuit 910.

The switching control circuit 960 can supply first and second switching signals (S11 and S21) corresponding to the normal mode or the force continuous current mode (FCCM) to the first and second transistors (T11 and T21) of the first voltage conversion circuit 501, respectively, based on the force continuous current mode (FCCM) driving signal output from the negative current controller 1220.

Referring to FIGS. 6, 11, and 12, when the mode control signal with the low voltage level is applied from the controller 140, the negative current controller 1220 can receive the first mode reference voltage VREFM1 and output an force continuous current mode (FCCM) driving signal corresponding to the normal mode, and the switching control circuit 960 may output first and second switching signals (S11 and S21) corresponding to the normal mode.

In this case, the first voltage conversion circuit 501 can operate in the normal mode, and a current path from the first node N11 toward the fourth node N41 and a current path from the first node N11 toward the ground line GND connected to the first transistor T11 can be formed. Accordingly, a positive current pattern such as 'A1' of FIG. 12 can be detected at the second node N21.

When the mode control signal with the high voltage level is applied from the controller 140, the negative current controller 1220 can receive the second mode reference voltage VREFM2 and output an force continuous current mode (FCCM) driving signal corresponding to the force continuous current mode (FCCM), and the switching control circuit 960 can output first and second switching signals (S11, S21) corresponding to the force continuous current mode (FCCM).

In this case, the first voltage conversion circuit 501 can operate in the force continuous current mode (FCCM), and a current path from the fourth node N41 toward the first node N11 and a current path from the ground line GND connected to the first transistor T11 toward the first node N11 can be formed. Accordingly, a negative current pattern such as 'A2' of FIG. 12 can be detected at the second node N21.

Referring to FIG. 13, the mode control signal supplied to the first voltage conversion circuit 501 from the controller 140 may include a first control pulse CP1 and a second control pulse CP2. For example, the first control pulse CP1 and the second control pulse CP2 may correspond to a period during which the mode control signal with the high voltage level is applied.

A pulse width of the first control pulse CP1 may correspond to a length of a first voltage changing period during which a source driving voltage SVDD output from the first voltage conversion circuit 501 is changed from a first voltage level VL1 to a second voltage level VL2.

Further, a pulse width of the second control pulse CP2 may correspond to a length of a second voltage changing period during which the source driving voltage SVDD output from the first voltage conversion circuit 501 is changed from the second voltage level VL2 to the first voltage level VL1.

For example, the first control pulse CP1 may correspond to (or overlap with) a start time of the period of an anode reset frame AR, and the second control pulse CP2 may correspond to (or overlap with) an end time of the period of the anode reset frame AR.

For example, to reduce power consumption, the first voltage conversion circuit 501 can supply the source driving voltage SVDD with the first voltage level VL1 during the period of a refresh frame RF, and supply the source driving voltage SVDD with the second voltage level VL2 lower than the first voltage level VL1 during the period of an anode reset frame AR. In this case, since power consumption loss may occur when the force continuous current mode (FCCM) is driven during all of the period of the anode reset frame AR, the force continuous current mode (FCCM) may be driven only in the voltage changing period, and thereby, power consumption loss can be reduced, and a time delay while voltage changing is performed can be reduced.

Figure 14:
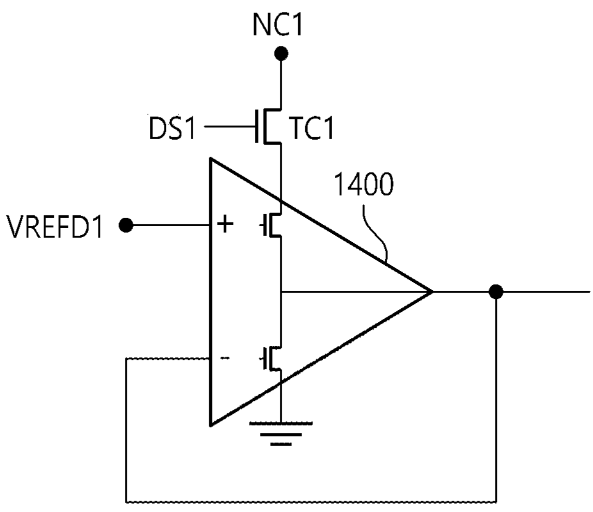
FIGS. 14 and 15 illustrate example first and second driving voltage supply circuits included in the power management circuit according to aspects of the present disclosure.
Figure 15:
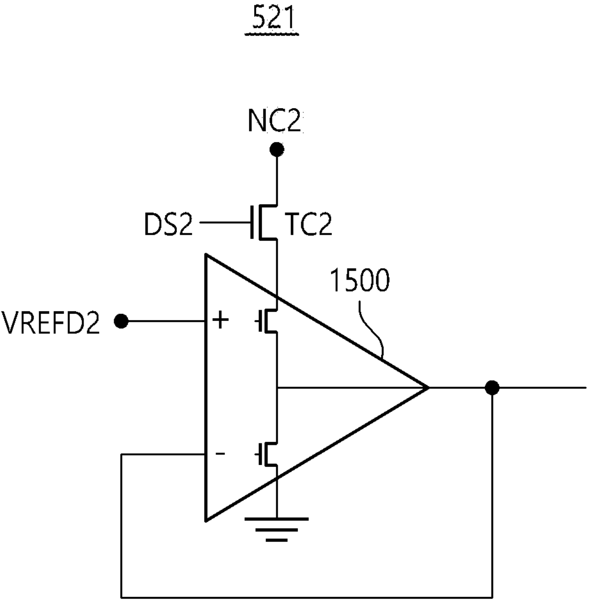

FIGS. 14 and 15 illustrate example configurations of the first driving voltage supply circuit (511 and 512) and the second driving voltage supply circuit 521 included in the power management circuit 150 according to aspects of the present disclosure.

FIG. 14 illustrates an example configuration of the first driving voltage supply circuit (511 and 512), and FIG. 15 illustrates an example configuration of the second driving voltage supply circuit 521.

Referring to FIG. 14, in one or more example embodiments, the first driving voltage supply circuit (511 and 512) may include a first reference voltage supply circuit 511 configured to generate a reference voltage with a high voltage level VREF_H and a second reference voltage supply circuit 512 configured to generate a reference voltage with a low voltage level VREF_L.

The first reference voltage supply circuit 511 and the second reference voltage supply circuit 512 may include first driving amplifiers 1400 configured to generate a reference voltage with a high voltage level VREF_H and a reference voltage with a low voltage level VREF_L, respectively, based on a first input voltage output from the first voltage conversion circuit 501 and a preset first driving reference voltage VREFD1.

For example, the respective first driving reference voltages VREFD1 supplied to the first reference voltage supply circuit 511 and the first reference voltage supply circuit 512 may be set to be the same as or different from each other.

Each of the first reference voltage supply circuit 511 and the second reference voltage supply circuit 512 may further include a first driving control transistor TC1 connected between a first control node NC1 to which a first input voltage is applied and the first driving amplifier 1400 and configured to control the supply of the first input voltage to the first driving amplifier 1400 according to a switching operation.

For example, the first driving control transistor TC1 may be turned on or off based on a first driving control signal DS1 with a turn-on voltage level or a first driving control signal DS1 with a the turn-off voltage level supplied from the controller 140.

In an example where the first driving control transistor TC1 is an n-type transistor, the turn-on voltage level of the first driving control signal DS1 may be a high voltage level, and the turn-off voltage level of the first driving control signal DS1 may be a low voltage level.

Further, in an example where the first driving control transistor TC1 is a p-type transistor, the turn-on voltage level of the first driving control signal DS1 may be a low voltage level, and the turn-off voltage level of the first driving control signal DS1 may be a high voltage level.

For example, the first driving control transistor TC1 may be supplied with the first driving control signal DS1 with the turn-on voltage level during a refresh frame RF, and be supplied with the first driving control signal DS1 with the turn-off voltage level during an anode reset frame AR.

For example, the first driving voltage supply circuit (511 and 512) may be supplied with the first driving control signal DS1 with the turn-on voltage level from the controller 140 during the refresh frame RF. Thereby, the first driving control transistor TC1 can be turned on, and the first control node NC1 and the first driving amplifier 1400 can be connected. Accordingly, the first driving voltage supply circuit (511 or 512) can be activated.

Further, the first driving voltage supply circuit (511 and 512) may be supplied with the first driving control signal DS1 with the turn-off voltage level from the controller 140 during the anode reset frame AR. Thereby, the first driving control transistor TC1 can be turned off and the connection between the first control node NC1 and the first driving amplifier 1400 can be disconnected. Accordingly, the first driving voltage supply circuit (511 or 512) can be deactivated.

Referring to FIG. 15, in one or more example embodiments, the second driving voltage supply circuit 521 may include a second driving amplifier 1500 configured to generate a parking voltage VPARK based on a second input voltage output from the second voltage conversion circuit 502 and a preset second driving reference voltage VREFD2.

Further, the second driving voltage supply circuit 521 may further include a second driving control transistor TC2 connected between a second control node NC2 to which a second input voltage is applied and the second driving amplifier 1500 and configured to control the supply of the second input voltage to the second driving amplifier 1500 according to a switching operation.

For example, the second driving control transistor TC2 can be turned on or off based on a second driving control signal DS2 with a turn-on voltage level or a second driving control signal DS2 with a the turn-off voltage level supplied from the controller 140.

In an example where the second driving control transistor TC2 is an n-type transistor, the turn-on voltage level of the second driving control signal DS2 may be a high voltage level, and the turn-off voltage level of the second driving control signal DS2 may be a low voltage level.

Further, in an example where the second driving control transistor TC2 is a p-type transistor, the turn-on voltage level of the second driving control signal DS2 may be a low voltage level, and the turn-off voltage level of the second driving control signal DS2 may be a high voltage level.

For example, the second driving control transistor TC2 may be supplied with the second driving control signal DS2 with the turn-on voltage level during an anode reset frame AR, and be supplied with the second driving control signal DS2 with the turn-off voltage level during a refresh frame RF.

For example, the second driving voltage supply circuit 521 may be supplied with the second driving control signal DS2 with the turn-on voltage level from the controller 140 during the anode reset frame AR. Thereby, the second driving control transistor TC2 can be turned on, and the second control node NC2 and the second driving amplifier 1500 can be connected. Accordingly, the second driving voltage supply circuit 521 can be activated.

Further, the second driving voltage supply circuit 521 may be supplied with the second driving control signal DS2 with the turn-off voltage level from the controller 140 during the refresh frame RF. Thereby, the second driving control transistor TC2 can be turned off, and the connection between the second control node NC2 and the second driving amplifier 1500 can be disconnected. Accordingly, the second driving voltage supply circuit 521 can be deactivated.

Figure 16:
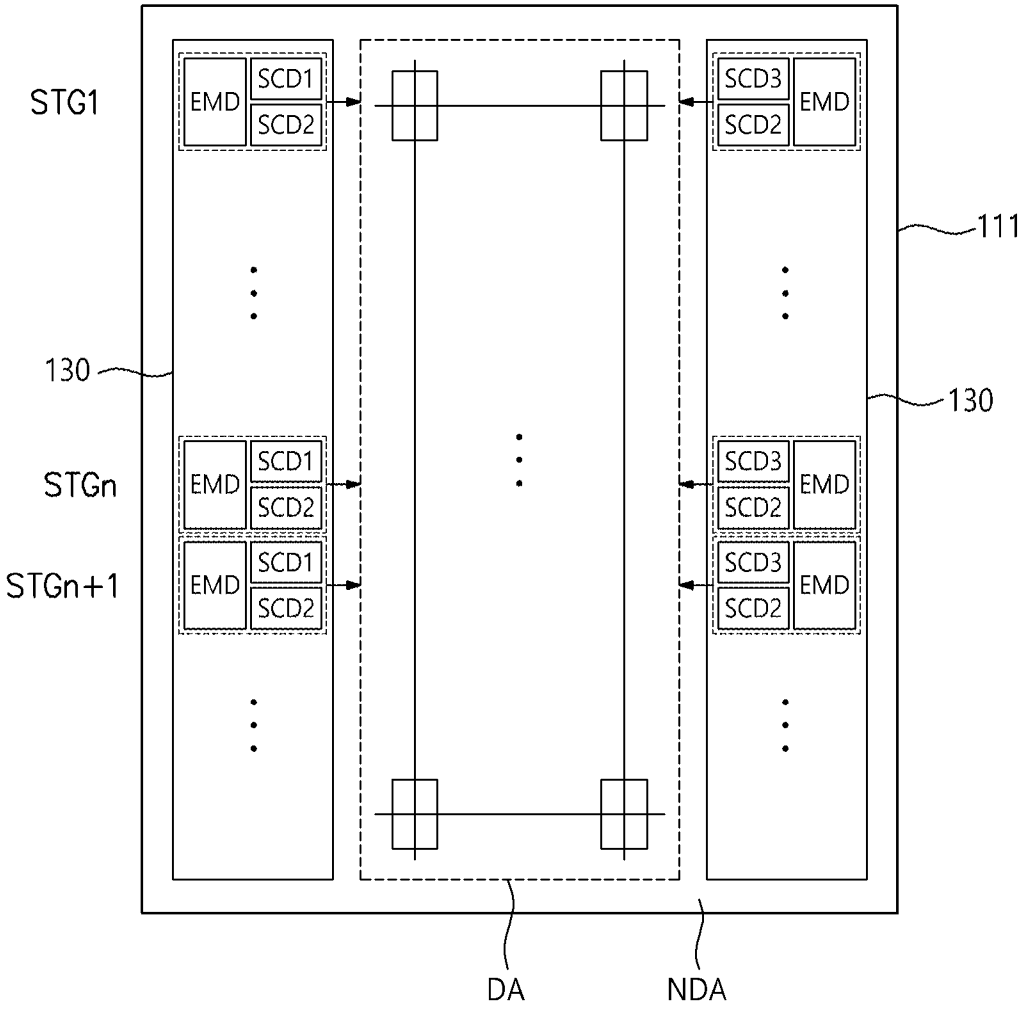
FIGS. 16 and 17 illustrate an example gate driving circuit according to aspects of the present disclosure.
Figure 17:
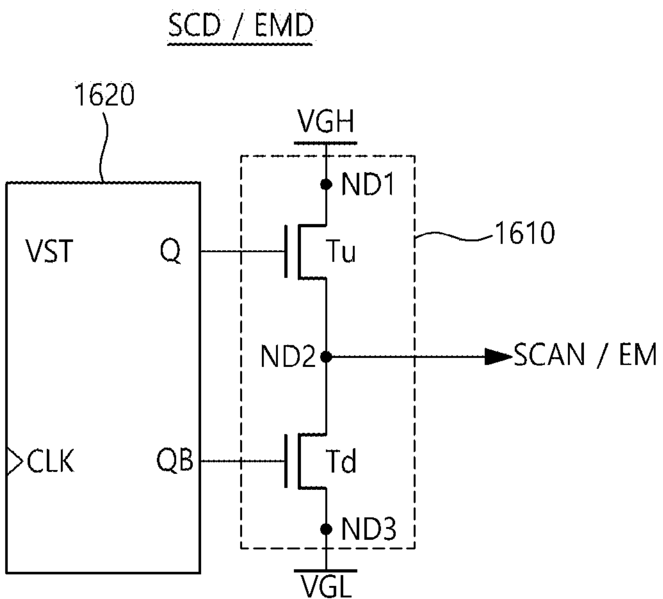

FIGS. 16 and 17 illustrate example configurations of the gate driving circuit 130 according to aspects of the present disclosure.

FIG. 16 illustrates an example configuration of the gate driving circuit 130 including a plurality of stages (STG1 to STGn+1), and FIG. 17 illustrates an example scan driver SCD and an example emission control driver EMD provided in each of the plurality of stages (STG1 to STGn+1).

Referring to FIG. 16, in one or more example embodiments, the gate driving circuit 130 may include a plurality of GIP circuits corresponding to each of a plurality of stages (STG1 to STGn+1). For example, the plurality of GIP circuits may be disposed in the non-display area NDA.

For example, the plurality of GIP circuits corresponding to each of the plurality of stages STG may include a GIP circuit disposed in a left non-display area NDA and a GIP circuit disposed in a right non-display area NDA with respective to the display area DA, but aspects of the present disclosure are not limited thereto. For example, the plurality of GIP circuits corresponding to each of the plurality of stages STG may be disposed only in a portion of the non-display area NDA corresponding to either the left or right side of the display area DA.

Each of the plurality of GIP circuits may include at least one of a first scan driver SCD1, a second scan driver SCD2, a third scan driver SCD3, and an emission control driver EMD.

Referring to FIG. 16, the GIP circuit disposed in the left non-display area NDA may include the first scan driver SCD1, the second scan driver SCD2, and the emission control driver EMD, and the GIP circuit disposed in the right non-display area NDA may include the second scan driver SCD2, the third scan driver SCD3, and the emission control driver EMD.

For example, the second scan driver SCD2 may be disposed in both the GIP circuit in the left non-display area NDA and the GIP circuit in the right non-display area NDA.

However, the arrangement of the drivers in the GIP circuit is not limited thereto, and the drivers disposed in each of the plurality of GIP circuits may be designed or changed variously by design requirements.

Referring to FIG. 16, the first scan driver SCD1 included in an $n^{th}$ stage STGn can supply a first scan gate signal SCAN1 to an $n^{th}$ subpixel, the second scan driver SCD2 can supply a second scan gate signal SCAN2 to the $n^{th}$ subpixel, the third scan driver SCD3 can supply a third scan gate signal SCAN3 to the $n^{th}$ subpixel, and the emission control driver EMD can supply an emission control gate signal EM to the $n^{th}$ subpixel.

In one or more aspects, referring to FIGS. 3 and 16, a fourth transistor T4 in the $n^{th}$ subpixel SP may be supplied with a third scan gate signal SCAN3 from the third scan driver SCD3 in the $n^{th}$ stage STGn, and a sixth transistor T6 in the $n^{th}$ subpixel SP may be supplied with the third scan gate signal SCAN3 from the third scan driver SCD3 in the $(n+1)^{th}$ stage STGn+1.

Referring to FIG. 17, in one or more example embodiments, each of at least one scan drivers SCD and an emission control driver EMD may include a buffer circuit 1610 and a control circuit 1620. For example, the at least one scan driver SCD may include the first scan driver SCD1, the second scan driver SCD2, and the third scan driver SCD3.

The buffer circuit 1610 may include a pull-up transistor Tu connected between a first node ND1 and a second node ND2 and a pull-down transistor Td connected between a third node ND3 and the second node ND2.

The control circuit 1620 can control voltages of the first control node (i.e., Q node) which is the gate node of the pull-up transistor Tu and the second control node (i.e., QB node) which is the gate node of the pull-down transistor Td.

Each of the buffer circuits 1610 included in the scan drivers SCD and the emission control driver EMD can output a gate driving signal to a gate line electrically connected to the second control node.

For example, the buffer circuit 1610 of the first scan driver SCD1 can output a first scan gate signal SCAN1, the buffer circuit 1610 of the second scan driver SCD2 can output a second scan gate signal SCAN2, the buffer circuit 1610 of the third scan driver SCD3 can output a third scan gate signal SCAN3, and the buffer circuit 1610 of the emission control driver EMD can output an emission control gate signal EM.

One of a first power supply voltage applied to the first node ND1 of the buffer circuit 1610 and a second power supply voltage applied to the third node ND3 thereof may be a gate low voltage VGL, and the other thereof may be a gate high voltage VGH higher than the gate low voltage VGL. For example, the gate low voltage VGL and the gate high voltage VGH may be supplied from the power management circuit 150.

For example, when the pull-up transistor Tu and the pull-down transistor Td are n-type transistors, the first power supply voltage may be the gate high voltage VGH, and the second power supply voltage may be the gate low voltage VGL.

Further, when the pull-up transistor Tu and the pull-down transistor Td are p-type transistors, the first power supply voltage may be the gate low voltage VGL, and the second power supply voltage may be the gate high voltage VGH.

According to the configuration of FIG. 17, each of the scan drivers SCD and the emission control driver EMD can receive a start signal VST and a clock signal CLK from the controller 140, and be supplied with a gate high voltage VGH as a first power voltage and a gate low voltage VGL as a second power voltage. Thereby, each of the scan drivers SCD and the emission control driver EMD can supply a corresponding gate signal among scan gate signals (SCAN1, SCAN2, and SCAN3) and an emission control gate signal EM.

For example, the start signal VST and the clock signal CLK supplied to each of the scan drivers SCD and the emission control driver EMD may be the same or different from each other.

The examples, aspects, and embodiments for the display device 100 and the display panel 110 described herein may be described as follows.

According to the one or more example embodiments described herein, a display device can be provided that includes a display panel including a plurality of gate lines, a plurality of data lines, and a plurality of subpixels, a data driving circuit configured to supply data voltages to the plurality of data lines, a gate driving circuit configured to drive the plurality of gate lines, a controller configured to supply image data corresponding to the data voltages to the data driving circuit and control the data driving circuit and the gate driving circuit, and a power management circuit including a plurality of voltage conversion circuits, and a plurality of driving voltage supply circuits each configured to supply a driving voltage to at least one of the plurality of subpixels, the data driving circuit, the gate driving circuit, and the controller based on an input voltage supplied from a corresponding one of the plurality of voltage conversion circuits. In one or more aspects, the power management circuit may be configured to cause a first driving voltage supply circuit configured to supply a first driving voltage to the data driving circuit among the plurality of driving voltage supply circuits to be deactivated during at least one first sub-frame in at least one frame corresponding to the image data.

In one or more aspects, the power management circuit may be configured to cause a second driving voltage supply circuit configured to supply a second driving voltage to the data driving circuit among the plurality of driving voltage supply circuits to be deactivated during at least one second sub-frame in the at least one frame.

In one or more aspects, the at least one first sub-frame may be an anode reset frame, and the at least one second sub-frame may be a refresh frame.

In one or more aspects, the first driving voltage may be a reference voltage for generating a gamma voltage in the data driving circuit, and the second driving voltage may be a parking voltage supplied to the plurality of data lines by the data driving circuit during the at least one first sub-frame.

In one or more aspects, the first driving voltage supply circuit may include a first reference voltage supply circuit configured to generate a reference voltage with a high voltage level and supply the reference voltage of the high voltage level to the data driving circuit, and a second reference voltage supply circuit configured to generate a reference voltage with a low voltage level and supply the reference voltage of the low voltage level to the data driving circuit.

In one or more aspects, the plurality of voltage conversion circuits may include a first voltage conversion circuit configured to convert an initial voltage supplied from a system power source into a first input voltage and supply the first input voltage to the first driving voltage supply circuit, and a second voltage conversion circuit configured to convert the initial voltage into a second input voltage and supply the second input voltage to the second driving voltage supply circuit.

In one or more aspects, the first voltage conversion circuit may be configured to supply the first input voltage with a first voltage level during the at least one second sub-frame, and change the first voltage level of the first input voltage to a second voltage level less than the first voltage level during the at least one first sub-frame and supply the first input voltage with the second voltage level.

In one or more aspects, the first voltage conversion circuit may be configured to receive a mode control signal from the controller, and operate in a force continuous current mode in at least one of a first voltage changing period during which the first input voltage is changed from the first voltage level to the second voltage level and a second voltage changing period during which the first input voltage is changed from the second voltage level to the first voltage level based on the mode control signal.

In one or more aspects, the mode control signal may include a first control pulse and a second control pulse. In one or more aspects, a pulse width of the first control pulse may correspond to a length of the first voltage changing period, and a pulse width of the second control pulse may correspond to a length of the second voltage changing period.

In one or more aspects, the plurality of voltage conversion circuits may further include a third voltage conversion circuit configured to convert the initial voltage into a third input voltage.

In one or more aspects, the plurality of driving voltage supply circuits may further include a third driving voltage supply circuit configured to receive at least one of the second input voltage and the third input voltage, generate at least one third driving voltage, and supply the at least one third driving voltage to a source node or a drain node of at least one transistor included in each of the plurality of subpixels, and a fourth driving voltage supply circuit configured to receive at least one of the second input voltage and the third input voltage, generate at least one fourth driving voltage, and supply the at least one fourth driving voltage to the gate driving circuit.

In one or more aspects, the at least one third driving voltage may include at least one of a bias voltage, an initialization voltage, and an anode reset voltage, and the at least one fourth driving voltage may include at least one of a gate high voltage and a gate low voltage.

In one or more aspects, the gate driving circuit may be configured to generate a gate signal supplied to a gate node of the at least one transistor through at least one gate line among the plurality of gate lines based on the at least one fourth driving voltage.

In one or more aspects, the first voltage conversion circuit may be configured to supply the first input voltage with a first voltage level during the second sub-frame.

In one or more aspects, the second voltage conversion circuit may be configured to supply the second input voltage with a third voltage level greater than the first voltage level during the at least one first sub-frame and the at least one second sub-frame.

In one or more aspects, the third voltage conversion circuit may be configured to supply the third input voltage with a fourth voltage level less than the first voltage level.

In one or more aspects, the plurality of voltage conversion circuits may include at least one of a buck converter, a boost converter, and a buck-boost converter.

According to one or more example embodiments of the present disclosure, a power management circuit can be provided that includes a first voltage conversion circuit configured to convert an initial voltage supplied from a system power supply into a first input voltage, a second voltage conversion circuit configured to convert the initial voltage into a second input voltage, a first driving voltage supply circuit configured to generate a first driving voltage based on the first input voltage, supply the first driving voltage to a data driving circuit, and be deactivated during at least one first sub-frame in at least one frame corresponding to image data supplied from a controller to the data driving circuit, and a second driving voltage supply circuit configured to generate a second driving voltage based on the second input voltage, supply the second driving voltage to the data driving circuit, and be deactivated during at least one second sub-frame in the at least one frame.

In one or more aspects, the first driving voltage supply circuit may include a first driving amplifier configured to generate a first driving voltage based on the first input voltage, and a first driving control transistor disposed between a first driving voltage line to which the first driving voltage is supplied and the first driving amplifier, and configured to cause the first driving amplifier to be deactivated during the at least one first sub-frame through a switching operation based on a first driving control signal supplied from the controller.

In one or more aspects, In one or more aspects, the second driving voltage supply circuit may include a second driving amplifier configured to generate a second driving voltage based on the second input voltage, and a second driving control transistor disposed between a second driving voltage line to which the second driving voltage is supplied and the second driving amplifier, and configured to cause the second driving amplifier to be deactivated during the at least one second sub-frame through a switching operation based on a second driving control signal supplied from the controller.

In one or more aspects, the first voltage conversion circuit may be configured to supply the first input voltage with a first voltage level during the at least one second sub-frame and supply the first input voltage with a second voltage level less than the first voltage level during the at least one first sub-frame.

In one or more aspects, the first voltage conversion circuit may be configured to receive a mode control signal from the controller and operate in a force continuous current mode in at least one of a first voltage changing period during which the first input voltage is changed from the first voltage level to the second voltage level and a second voltage changing period during which the first input voltage is changed from the second voltage level to the first voltage level based on the mode control signal.

In one or more aspects, the first voltage conversion circuit may include a first transistor and a second transistor, a current sensing circuit configured to detect a current at a node to which the first transistor and the second transistor are connected, a mode control circuit configured to output a force continuous current mode driving signal for the operating in the force continuous current mode based on a current detection result of the current sensing circuit and the mode control signal, and a switching control circuit configured to control switching operation of the first transistor and the second transistor based on the force continuous current mode driving signal.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the principles described herein may be applied to other embodiments and applications without departing from the scope of the present disclosure. The above description and the accompanying drawings provide an example of the technical idea of the present disclosure for illustrative purposes only. That is, the disclosed embodiments are intended to illustrate the scope of the technical idea of the present disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:

a display panel comprising a plurality of gate lines, a plurality of data lines, and a plurality of subpixels;

a data driving circuit configured to supply data voltages to the plurality of data lines;

a gate driving circuit configured to drive the plurality of gate lines;

a controller configured to supply image data corresponding to the data voltages to the data driving circuit and control the data driving circuit and the gate driving circuit; and a power management circuit comprising a plurality of voltage conversion circuits, and a plurality of driving voltage supply circuits each configured to supply a driving voltage to at least one of the plurality of subpixels, the data driving circuit, the gate driving circuit, or the controller based on an input voltage supplied from a corresponding one of the plurality of voltage conversion circuits, wherein the power management circuit is configured to cause a first driving voltage supply circuit configured to supply a first driving voltage to the data driving circuit among the plurality of driving voltage supply circuits to be deactivated during at least one first sub-frame in at least one frame corresponding to the image data.

2. The display device of claim 1, wherein the power management circuit is configured to cause a second driving voltage supply circuit configured to supply a second driving voltage to the data driving circuit among the plurality of driving voltage supply circuits to be deactivated during at least one second sub-frame in the at least one frame.

3. The display device of claim 2, wherein the at least one first sub-frame is an anode reset frame, and the at least one second sub-frame is a refresh frame.

4. The display device of claim 2, wherein the first driving voltage is a reference voltage for generating a gamma voltage in the data driving circuit, and the second driving voltage is a parking voltage supplied to the plurality of data lines by the data driving circuit during the at least one first sub-frame.

5. The display device of claim 4, wherein the first driving voltage supply circuit comprises:

a first reference voltage supply circuit configured to generate a reference voltage with a first voltage level and supply the reference voltage of the first voltage level to the data driving circuit; and a second reference voltage supply circuit configured to generate a reference voltage with a second voltage level and supply the reference voltage of the second voltage level to the data driving circuit, wherein the second voltage level is lower than the first voltage level.

6. The display device of claim 2, wherein the plurality of voltage conversion circuits comprise:

a first voltage conversion circuit configured to convert an initial voltage supplied from a system power source into a first input voltage and supply the first input voltage to the first driving voltage supply circuit; and a second voltage conversion circuit configured to convert the initial voltage into a second input voltage and supply the second input voltage to the second driving voltage supply circuit.

7. The display device of claim 6, wherein the first voltage conversion circuit is configured to supply the first input voltage with a first voltage level during the at least one second sub-frame, and change the first voltage level of the first input voltage to the second voltage level less than the first voltage level during the at least one first sub-frame and supply the first input voltage with the second voltage level.

8. The display device of claim 7, wherein the first voltage conversion circuit is configured to receive a mode control signal from the controller, and operate in a force continuous current mode in at least one of a first voltage changing period during which the first input voltage is changed from the first voltage level to the second voltage level and a second voltage changing period during which the first input voltage is changed from the second voltage level to the first voltage level based on the mode control signal.

9. The display device of claim 8, wherein the mode control signal comprises a first control pulse and a second control pulse, and wherein a pulse width of the first control pulse corresponds to a length of the first voltage changing period, and a pulse width of the second control pulse corresponds to a length of the second voltage changing period.

10. The display device of claim 6, wherein the plurality of voltage conversion circuits further comprise a third voltage conversion circuit configured to convert the initial voltage into a third input voltage, and wherein the plurality of driving voltage supply circuits further comprise:

a third driving voltage supply circuit configured to receive at least one of the second input voltage or the third input voltage, generate at least one third driving voltage, and supply the at least one third driving voltage to a source node or a drain node of at least one transistor included in each of the plurality of subpixels; and a fourth driving voltage supply circuit configured to receive at least one of the second input voltage and the third input voltage, generate at least one fourth driving voltage, and supply the at least one fourth driving voltage to the gate driving circuit.

11. The display device of claim 10, wherein the at least one third driving voltage comprises at least one of a bias voltage, an initialization voltage, or an anode reset voltage, and the at least one fourth driving voltage comprises at least one of a gate high voltage or a gate low voltage.

12. The display device of claim 10, wherein the gate driving circuit is configured to generate a gate signal to be supplied to a gate node of the at least one transistor through at least one gate line among the plurality of gate lines based on the at least one fourth driving voltage.

13. The display device of claim 10, wherein:

the first voltage conversion circuit is configured to supply the first input voltage with a first voltage level during the second sub-frame;

the second voltage conversion circuit is configured to supply the second input voltage with a third voltage level greater than the first voltage level during the at least one first sub-frame and the at least one second sub-frame; and the third voltage conversion circuit is configured to supply the third input voltage with a fourth voltage level less than the first voltage level.

14. The display device of claim 1, wherein the plurality of voltage conversion circuits comprise at least one of a buck converter, a boost converter, or a buck-boost converter.

15. A power management circuit comprising:

a first voltage conversion circuit configured to convert an initial voltage supplied from a system power supply into a first input voltage;

a second voltage conversion circuit configured to convert the initial voltage into a second input voltage;

a first driving voltage supply circuit configured to generate a first driving voltage based on the first input voltage and supply the first driving voltage to a data driving circuit, the first driving voltage supply circuit configured to be deactivated during at least one first sub-frame in at least one frame corresponding to image data supplied from a controller to the data driving circuit; and a second driving voltage supply circuit configured to generate a second driving voltage based on the second input voltage and supply the second driving voltage to the data driving circuit, the second driving voltage supply circuit configured to be deactivated during at least one second sub-frame in the at least one frame.

16. The power management circuit of claim 15, wherein the first driving voltage supply circuit comprises:

a first driving amplifier configured to generate a first driving voltage based on the first input voltage; and a first driving control transistor disposed between a first driving voltage line to which the first driving voltage is supplied and the first driving amplifier, and configured to cause the first driving amplifier to be deactivated during the at least one first sub-frame through a switching operation based on a first driving control signal supplied from the controller.

17. The power management circuit of claim 16, wherein the second driving voltage supply circuit comprises:

a second driving amplifier configured to generate a second driving voltage based on the second input voltage; and a second driving control transistor disposed between a second driving voltage line to which the second driving voltage is supplied and the second driving amplifier, and configured to cause the second driving amplifier to be deactivated during the at least one second sub-frame through a switching operation based on a second driving control signal supplied from the controller.

18. The power management circuit of claim 15, wherein the first voltage conversion circuit is configured to supply the first input voltage with a first voltage level during the at least one second sub-frame and supply the first input voltage with a second voltage level less than the first voltage level during the at least one first sub-frame, and receive a mode control signal from the controller and operate in a force continuous current mode in at least one of a first voltage changing period during which the first input voltage is changed from the first voltage level to the second voltage level and a second voltage changing period during which the first input voltage is changed from the second voltage level to the first voltage level based on the mode control signal.

19. The power management circuit of claim 18, wherein the first voltage conversion circuit comprises:

a first transistor and a second transistor;

a current sensing circuit configured to detect a current at a node to which the first transistor and the second transistor are connected;

a mode control circuit configured to output a force continuous current mode driving signal for the operating in the force continuous current mode based on a current detection result of the current sensing circuit and the mode control signal; and a switching control circuit configured to control switching operation of the first transistor and the second transistor based on the force continuous current mode driving signal.

* * * * *